US012052340B2

(12) United States Patent
Samid

(10) Patent No.: US 12,052,340 B2
(45) Date of Patent: Jul. 30, 2024

(54) NON-ENTANGLEMENT PHYSICAL SHARED AD-HOC RANDOMNESS (NEPSAR)

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 18/241,973

(22) Filed: Sep. 4, 2023

(65) Prior Publication Data

US 2024/0015002 A1   Jan. 11, 2024

Related U.S. Application Data

(63) Continuation-in-part of application No. 17/504,486, filed on Oct. 18, 2021, now Pat. No. 11,745,153.

(51) Int. Cl.
    *H04L 9/00*   (2022.01)
(52) U.S. Cl.
    CPC .................... *H04L 9/001* (2013.01)
(58) Field of Classification Search
    CPC .......... H04L 9/00; H04L 9/001; H04L 9/002; H04L 9/0816; H04L 9/0819; H04L 9/0838; H04L 9/085; H04L 9/0869
    See application file for complete search history.

(56) References Cited

U.S. PATENT DOCUMENTS

| | | | | |
|---|---|---|---|---|
| 5,930,362 A | * | 7/1999 | Daly | H04L 9/0841 380/282 |
| 8,418,235 B2 | * | 4/2013 | Sherkin | H04L 63/083 726/19 |
| 9,183,158 B2 | * | 11/2015 | O'Loughlin | H04L 9/3066 |
| 9,678,896 B2 | * | 6/2017 | O'Loughlin | H04L 9/3066 |
| 10,122,713 B2 | * | 11/2018 | Hubert | G06F 21/53 |
| 10,999,068 B2 | * | 5/2021 | Fu | H04L 63/061 |
| 2017/0264434 A1 | * | 9/2017 | Takahashi | H04L 9/0858 |

* cited by examiner

*Primary Examiner* — Hosuk Song

(57) ABSTRACT

A stack of rotating discs drilled with randomized holes allow a light fluid L to rise into a chamber filled with heavier fluid H, as a randomized stream of bubbles. The two fluids are mutually non-soluble, and of different electric conductivity, hence the randomized stream of bubbles generates a randomized curve of electrical resistance within the chamber, over time; this output resistance curve is shared by all parties that have a duplicate of the contraption and apply the same activation settings. The physical complexity of the contraptions keeps the randomness secure against all parties not in possession of the contraption. Unlike Entanglement and BB84 solutions, this invention generates shared randomness without communicating the same between the parties.

16 Claims, 10 Drawing Sheets

Fig-1
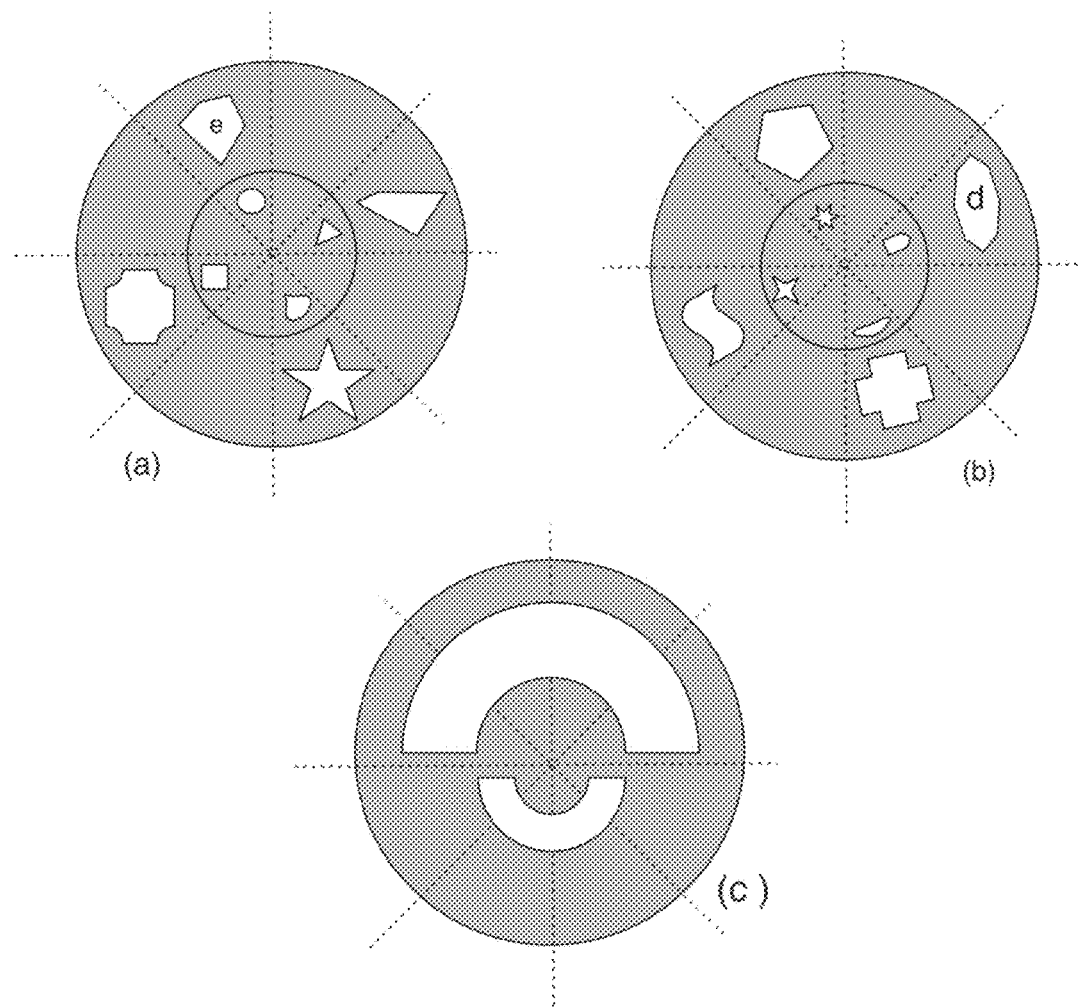
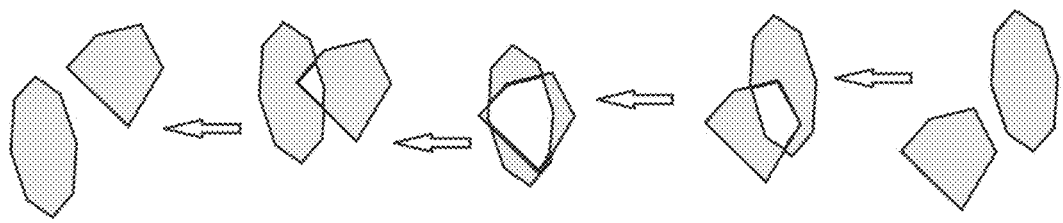
holes d and e dynamic overlap

Electric Motorized Disc

RandoSol Randomness Patterns low-mix high-mix

Fig-9 NESPAR Configuration

NON-ENTANGLEMENT PHYSICAL SHARED AD-HOC RANDOMNESS (NEPSAR)

CROSS REFERENCE TO RELATED PROVISIONAL APPLICATIONS

This application is also a continuation in part of U.S. patent application Ser. No. 17/063,523 filed Oct. 5, 2020. This application is also a continuation in part of U.S. patent application Ser. No. 15/997,662 filed Jun. 4, 2018.

(claimed by the continued Applications): Provisional Application 62580111 filed Nov. 1, 2017 Referenced in the continued Application Ser. No. 15/997,662, and Provisional Application 63/034,401 filed Jun. 4, 2020, Provisional Application 63/051,652 filed Jul. 14, 2020, Provisional Application 63/005,062 filed Apr. 3, 2020, Provisional Application 62/963,855, filed Jan. 21, 2020, Provisional Application 62/931,807 filed Nov. 7, 2019, Provisional Application 62/926,560 filed Oct. 27, 2019, Provisional Application 63/140,006, filed Jan. 21, 2021.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable

BACKGROUND OF THE INVENTION

Life in cyberspace places a pressing demand for remote communicators to share fresh secure randomness which is essential for virtually all cryptographic protocols. Most of the randomness used today is algorithmic, for which John Von Neumann observed that those who use algorithms to generate randomness understand neither algorithms, nor randomness. The prevailing trend to meet this challenge is based on entities of the quantum physics realm. These solutions face daunting difficulties and require specialized equipment, which is likely to price much of the users out of the market. A non-quantum, non-algorithmic answer to this universal challenge is offered by this invention.

BRIEF SUMMARY OF THE INVENTION

This invention meets a demanding need for fresh secure, non-algorithmic randomness to serve remote communicators for various cryptographic protocols. The invention is based on the deterministic complexity of physical contraptions—identical versions thereto are shared between the communicating parties. When such identical contraptions are subject to identical operation they generate sufficiently exact outcome—shared only by the parties in possession of a duplicate of same contraption. This shared outcome is duly regarded as effective physical randomness on account of the physical complexity that generates it. Essentially this invention generates randomness on account of a physical conversion of input randomness to output randomness. Contraption holding parties can therefore use this deterministic complexity to generate shared fresh randomness to sustain secure communication over insecure channels. This invention ensures the reliability of the operation via (i) physical redundancy, (ii) data reduction, and (iii) dividing the shared output to test portion v. use portion. Network security thereby is transformed into the physical security of the randomness-generating physical contraptions. Unlike quantum entanglement, BB84 and other solutions, this invention generates the shared randomness without communicating the same.

BRIEF DESCRIPTION OF THE SEVERAL VIEWS OF THE DRAWINGS

FIG. 1: NEPSAR Rotating Discs

The figure shows various option for drilling holes in RandoSol discs. Holes are of various locations, various sizes, and various shapes. Some discs have a large hole area, others have a small hole area. When these discs are assembled to a deck of disc and each rotates in its own direction and own speed, the area where the holes of the various discs overlap changes with the fixed parameters of the rotating discs and with their related movement. This complexity creates the randomness effect that is useful for cryptographic purposes. The bottom of the figure shows one hole from disc (a) and one hole from disc (b) (holes d, and e), as they are rotating one towards the other on counter rotating discs. The figure shows how from non-overlap status, the status progresses to partial overlap, to full overlap, and soon a smaller overlap to no overlap. The faster the relative speed of the counter rotating discs, the smaller the interval of time for the overlap and the smaller the bubble of lighter fluid that manages to pop out from below the two rotating discs to above. The smaller the bubble, the smaller its impact on the time measurements of electrical conductivity in the conductivity measurement chamber above the discs. Without knowledge of the construction of the discs and their movement over time, it is impossible to foretell the conductivity measurement impact due to the popping bubble.

Figure 2:
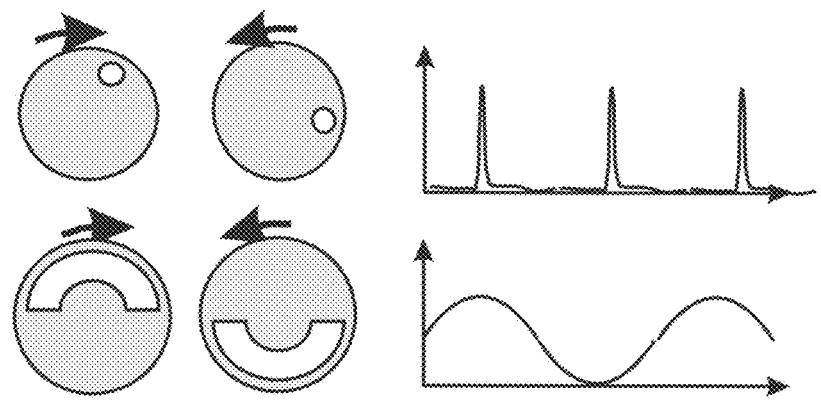

FIG. 2: RandoSol Small Hole, Big Hole

This figure shows two extreme cases of a RandoSol apparatus comprising two RandoSol discs, where each disc has one hole, the size of which is the same in both discs, and their positions are aligned. This setup may be considered as a basic configuration.

We first describe the upper case. Two small holes, placed so that when the discs rotate one towards the other, for a brief moment the two small holes overlap and allow for a small bubble of the lighter fluid to be making its way to the upper region above the discs. Note: we describe here discs in a vertical position where gravity does the work, but this will equally apply to a horizontal setting with a pump pushing one fluid through the discs to the other fluid. For most of the duration of the rotation of the discs the two holes do not overlap and hence no fluid passes through the two discs. The result of the electrical resistance in the measurement chamber as measured over time is described in the upper right graph: a flat line with occasions of brief peak. The interval between successive peaks depends practically fully on the angular speed of the two discs. This is important because it means that the intervals are not dependent, or very little dependent on the properties of the two fluids. So if two remote locations have fluids of slightly different properties, they will still measure the same time interval between two successive peaks. To the extent that the angular speed of rotations is randomized, so would the time interval between two peaks. If one makes these intervals to be the source of extracted randomness then the result will be the same in various remote locations using the same RandoSol contraption.

The second set of holes in the drawing depicts two large holes that shift from full overlap to zero overlap, passing all the in between states. This means that apart from the brief moment of zero overlap, there is always flow of the light fluid through the disc apparatus. The nature of the flow is a perfect sinusoid when the two discs rotating towards each other in uniform speed. The measurement of electrical conductivity over time will also be sinusoidal. The more the rotation speeds vary with time, the more chaotic the graph of resistance over time will be.

Figure 3:
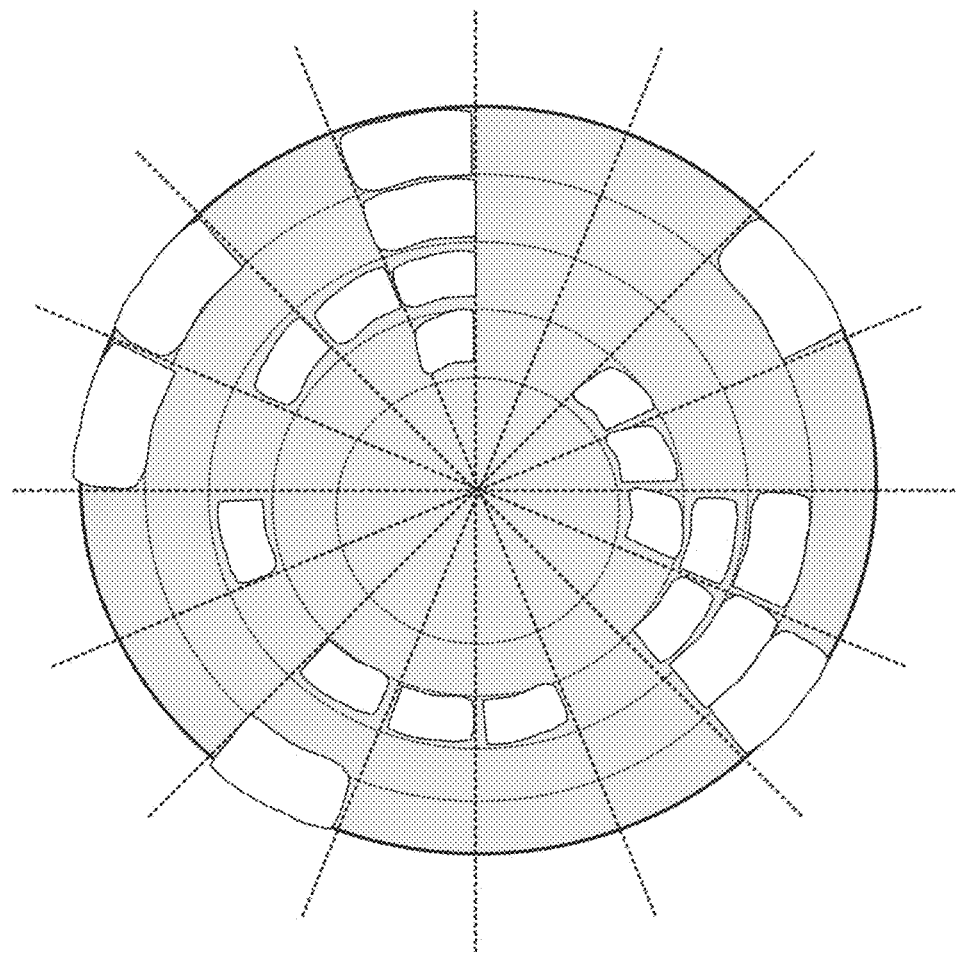

FIG. 3: Randomized Holes Per Disc

This figure shows how the surface of RandoSol disc is parceled out via polar elements based on a polar system of coordinates where radiuses and angles determine border. The designer will use a randomness source to designate each of the polar elements to be either a hole or a non-hole. This will result in a randomized allocation of holes in each disc. Suppose the disc is parceled out top polar elements. The designer may wish to have h of these polar elements with holes. Through going through the holes in one particular order, the designer when deciding the fate of polar element i (where $1 \le i \le p$) will set up the randomizer to assign element i to a hole with probability $Pr_h(i)$ to be:

$$Pr_h = (h-q)/(p-q-s)$$

where q is the number of polar elements from 1 to (i−1) that were already been designated to be holes, and s is the number of polar elements from 1 to (i−1) that were assigned to no-hole status. Of course: $q+s=i-1$.

And the probability for polar element i to be designated to become a no-hole polar element would be:

$$Pr_{nh} = (p-h-s)/(p-q-s)$$

This procedure ensures that whatever variance within the randomizer the p polar elements will have h holes and p-h non holes.

Figure 4:
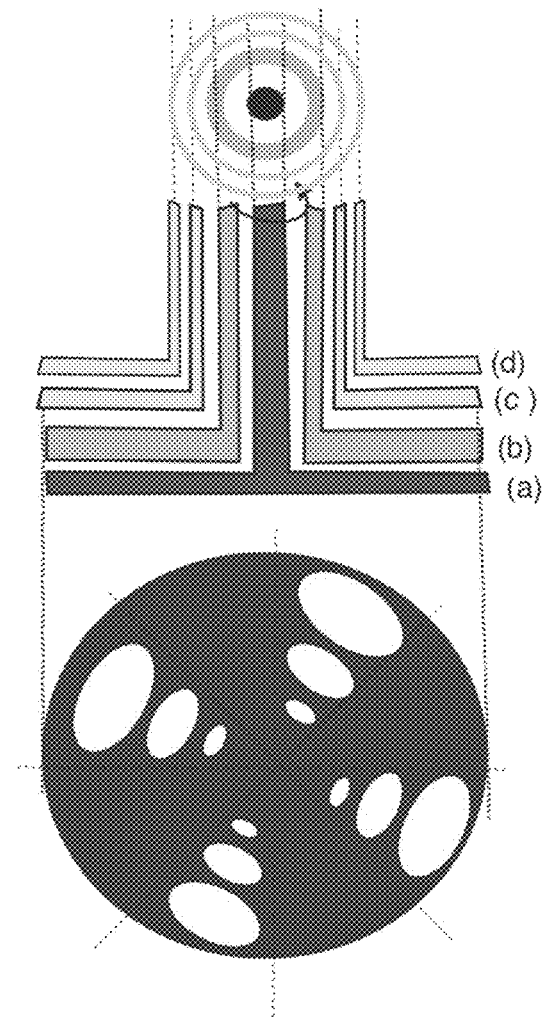

FIG. 4: Concentric Axes Disc Rotation

This figure shows how abreast discs may be rotated through a setup of concentric axes, enveloping each other while allowing each axis and its rotated disc to rotate independently from the other.

Figure 5:
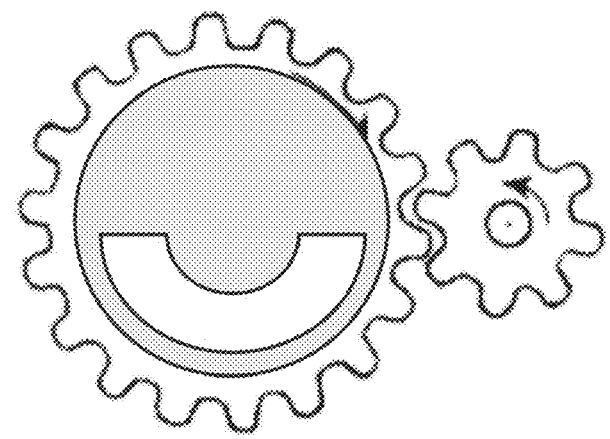

FIG. 5: Cogwheel Disc Rotation

This figure shows a side small cogwheel rotating a disc in disc pack. The side wheel for the next disc may be shifted a bit so that it does not sit abreast the first small cogwheel, and so for the other small cogwheels. This location spread allows one to fit an electric rotator for each of the small rotating wheels and rotate each small wheel in the direction and speed desired, and thereby rotate each disc in the NEPSAR disc pack in the direction and the rate desired.

Figure 6:
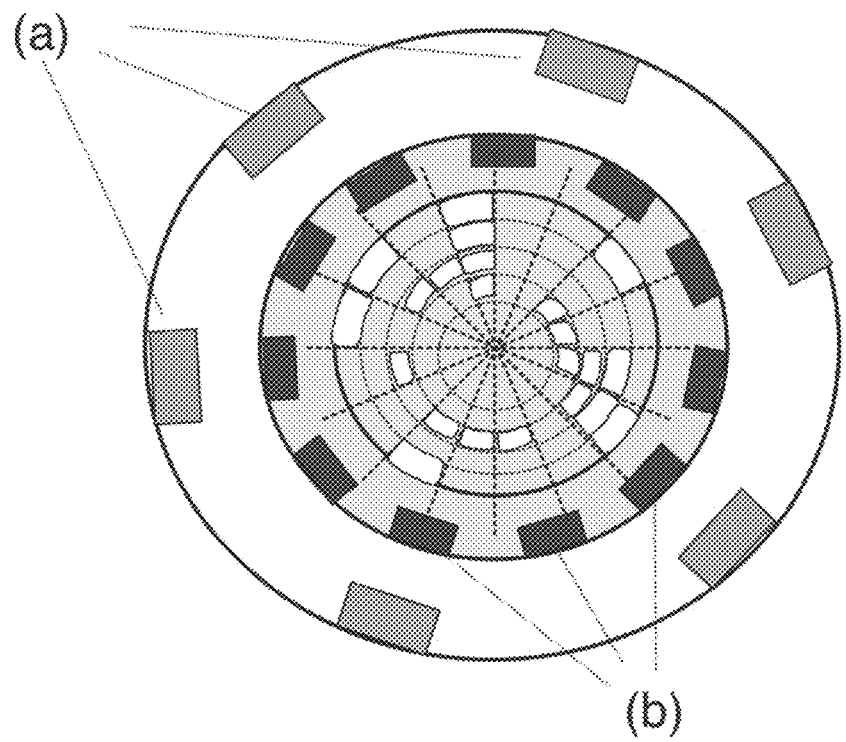

FIG. 6: Electric Motorized Disc

This figure shows a disc rotation solution based on 'mimicking' the electric motor. The disc is fitted with magnets and surrounded by a rotating ring fitted with dynamic electromagnets so as to generate a rotating force on the disc, in the direction and speed desired.

Figure 7:
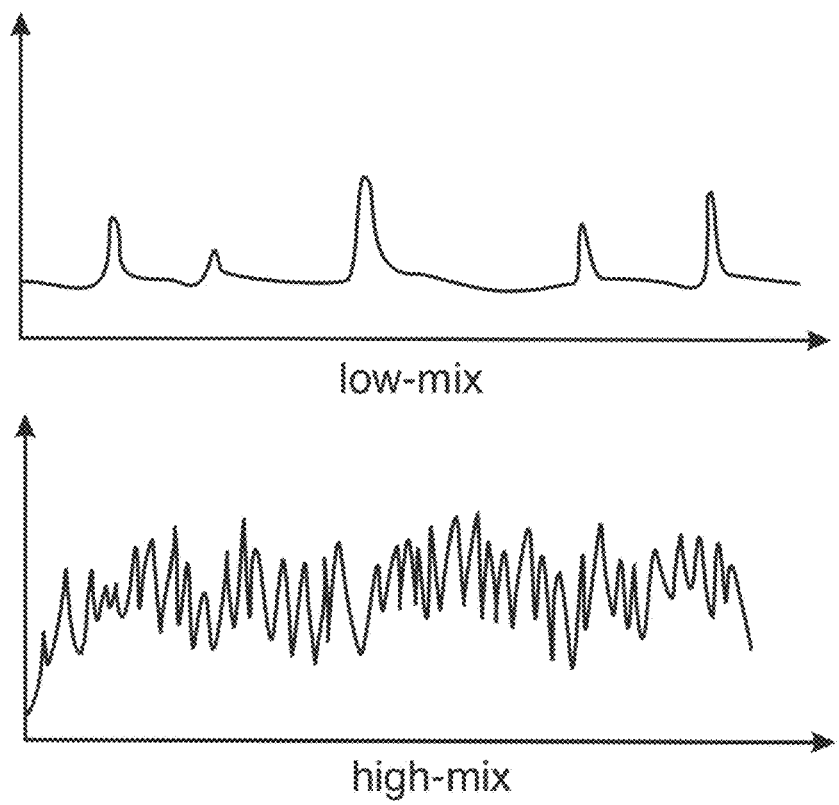

FIG. 7: RandoSol Randomness Patterns

This figure shows the two extreme patterns: a low-mix and a high-mix. A low mix is the case where infrequently a bubble of a light, low conductivity fluid is popping out to momentarily impact the resistance reading in the measurement chamber. The high-mix is the case where the light fluid flows at a high throughput, but because the frequent change of passage area the reading of the electric resistance in the measurement chamber appears chaotic.

Figure 8:
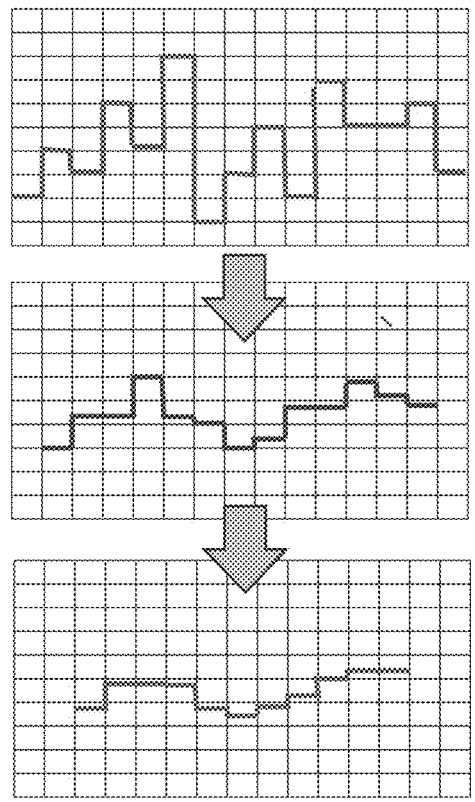

FIG. 8 Smoother Illustration

This figure demonstrates the smoothing effect of the 'smoother algorithm'. The original graph (upper part, drawn in red) is the original $y=f(x)$ function defined over the range $1 \le x \le 15$. The graph below is a result of smoothing the original function into f'(x) defined as $y'=f'(x)=(f(x-1)+f(x)+f(x+1))/3$ defined in the range $2 \le x \le 14$. Clearly the smooth function f' is 'smoother' than the original function, less up and down variations. Accordingly a function $f^* \ne f$, but similar to it, $f^* \sim f$, may be smoothed into f' and thereby one overcomes slight differences between measurements to extract the same binary series. The figure then shows a re-application of the smoother algorithm on the once-smoothed function f'. This 2nd application of smoothing is defined over the rage $3 \le x \le 13$:

$$y''=f''(x)=(f'(x-1)+f'(x)+f'(x+1))/3$$

as seen in the lower part of the drawing (green). Clearly f'' is much more 'smooth' (much less varied) then the once-applied smoothed function.

Figure 9:
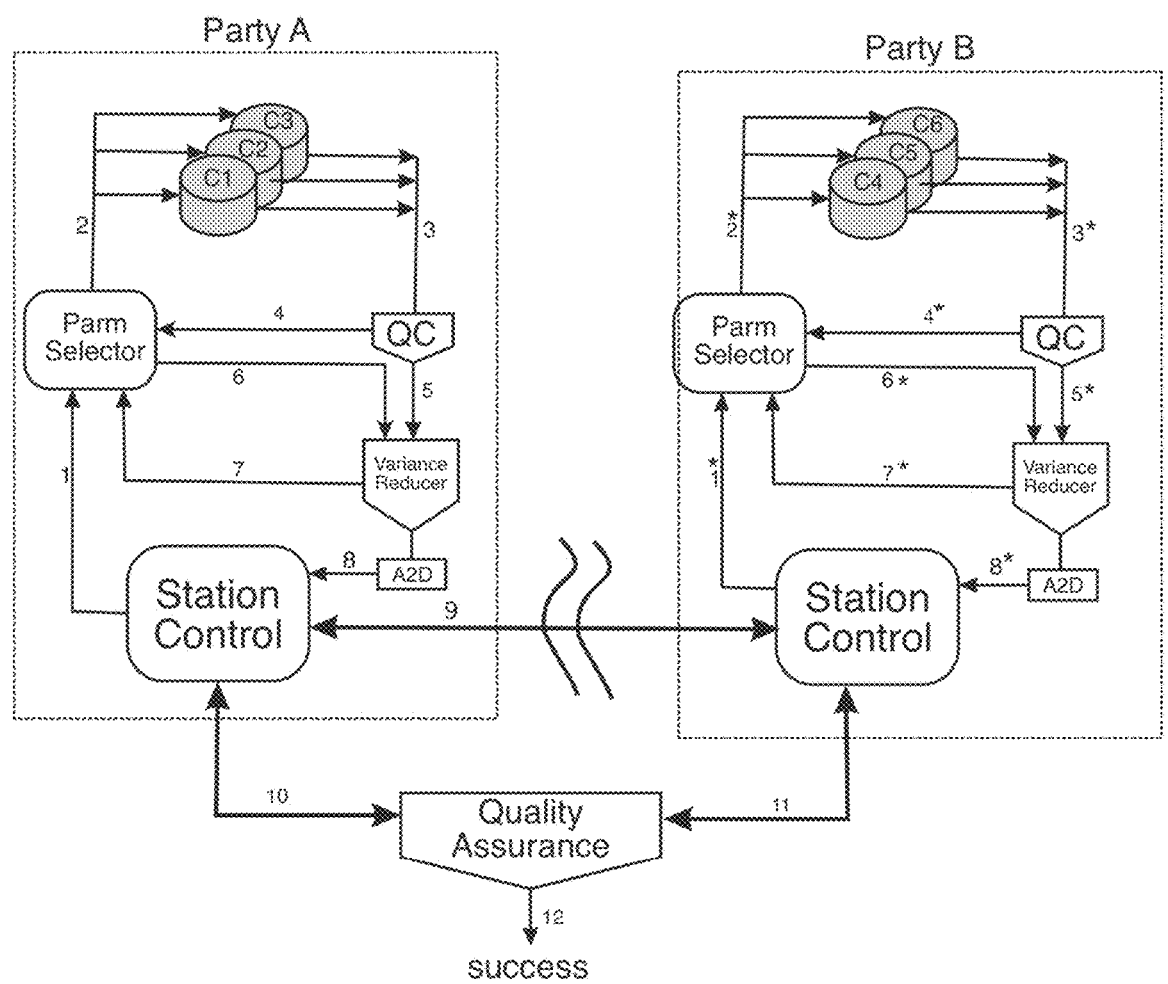

FIG. 9 NEPSAR Configuration

This figure illustrates an overall NEPSAR protocol between two remote partners, each in possession of a physical NEPSAR apparatus. Party A initiates a secret sharing session. To that end it operates from its "Station Control" box from where it activates the data function called "Parm Selector" (see arrow 1). This parameter selector selects parameters to be used in running the NEPSAR apparatus (activation settings). Such parameters are speed over time and direction over time for rotating all the discs in the disc pack, but it may also be selecting of physical parameters of the heavy and light fluids (the fluids of different electric resistance as the case is for RandoSol. (Arrow 2 indicates the parametric instructions passed from the Parm Selector to the one or several instances of the NEPSAR apparatus at the disposal of Party A. The drawing shows 3 apparatuses, $C_1$, $C_2$, $C_3$), The three apparatuses are being run with the same set parameters, generating the raw randomness payload (three versions of it). All three versions are routed to the quality control (QC) function. If the three payload versions from the three apparatuses, don't look sufficient enough, then the QC prompts the "Parm Selector" to try again, namely to come up with a new set of parameters and re-run the three apparatuses (this step in indicated by arrow 4). The so described loop repeats itself time and again until it passes the quality control similarity test. Once it passes the test the QC module sends the three raw payloads to the "Variance Reducer" module, (as indicated by arrow 5). The variance reducer uses the 'smoother function' and other protocols to extract the same binary string from all three instances of raw randomness payload curves (measurements of resistance over time within the measurement chamber). If this variance reduction is not working, and the three resulting variance reduced curves from the three duplicates of the apparatus are not sufficiently similar then the variance reducer negotiates with the Parm Selector (arrows 6 and 7) to run another session of the NEPSAR apparatuses in order to achieve an effective variance reduction. In this protocol the variance reduction works on the analog curve to replace it with a less varied curve.

Once analog variance was properly reduced, then the variance-reduced-raw payload curve is used as an extraction source for a binary string which is common to all the tested apparatuses (in the drawn case there are three such apparatuses). This is the analog-to-digital step (A2D). If the selected binary extraction (A2D step) does not yield three identical binary strings (corresponding to apparatus duplicates C1, C2, and C3) then this is declared as 'failure' and so communicated back to the "station control" (arrow 8). If the three bit strings are identical then the station control communicates to party B the parameters selected by the Parm Selector. This communication is depicted in arrow 9 leading from party A station control to party B station control. This step of communication is happening in the open, exposed to adversaries. The idea being that knowledge of the operational parameters without knowledge of the NEPSAR apparatus itself, is useless. To be even more safe, one could use any arbitrary encryption method to effect arrow 9, The party B station control will pass the operational parameters through its Parm Selector to the one or several instances of apparatuses at its disposal. The drawing shows party B in possession of three NEPSAR apparatus instances: $C_4$, $C_5$, $C_6$, Each of these three apparatuses, receiving the parametric selections communicated from party A, will generate corresponding raw randomness payload curves which will all be sent to part B QC (arrow 3*). If QC shows too much variance among the three instances of raw payloads, then it sends a negative signal to the station control (arrows 5*, 8*). The station control can then react in one of two options: either signal to party A: unacceptable results, prompting party A to try again, or party B takes the initiative and lets its Parm Selector to select parameters. In this option party B takes the role of initiator from part A, which becomes the respondent.

In both options either party A or party B restarts the process described above. New parameters are specified, they are evaluated "in house", then sent to the other party. This re-routing can happen several times. In general one may start with a high-mix (see FIG. 7) where small variations in fluid properties impact the result, and in case of failure, the parties progress towards lower level of mixing, down to low-mix as described in FIG. 7 where the distance between the sporadic peaks is determined mainly by the configurations of holes (fluid passage area) and much less dependent on slight variations in fluid properties. And since the passage area depends on the construction of the discs and their movement, it is easier to establish similarity between the measurements of the various remote parties who all use discs manufactured to exact specification and all use very accurate means for disc rotation. So by gradually shifting from high-mix to low-mix the parties end up with mixing parameters that satisfy the processes in all remote parties (in this figure only two parties are shown), and each party then holds a binary string, which expectedly is the same for all parties.

The figure further shows how a successful negotiation between the respective station controller, leads to the next step: quality assurance. This procedure is based on randomly selecting arbitrary t bits out of the n bits of which the various (expectedly the same) binary strings are comprised (the ready-randomness payload candidates). The identities of these t bits is compared among the communicating parties (2 parties in this figure). If any of the t bits is not in full agreement among all parties over the identity of each of the t bits, then the whole process is re-initiated, this time with further increased simplicity—more low-mix then high-mix. This simplifying options are continued until the quality assurance test is passed, namely, all selected t bits are listed of same identity by all participating parties. The larger the value of t, (close to n), the greater the confidence that the remaining bits (n-t) bits are indeed a shared secret among all parties which have possession of the apparatus and participated in this protocol.

Quality assurance may also include a 'doubt resolution' stage. The parties all figure out the identities of the n bits that comprised the shared bit string. Part i (out of k parties: i=1, 2, . . . k) finds it difficult to doubt-free determine the identities of some $q_i$ bits among the n bits comprising the extracted secret bit string. Party i will then share with the other k parties the serial position (order) of the $q_i$ bits for whom it was unclear as to their identity. Let $q_0$ be the list of all the bits that were marked as identity unclear by any of the k parties. This list will then be used by all parties to erase those bits from considerations, and only the remaining $n-q_0$ bits will be used as shared secret bits, and be subject to the quality assurance where t bits out of the $n-q_0$ bits are compared by participating parties (only two parties shown in this figure) and the remaining $n-q_0-t$ bits will constitute the shared secret bit string that was generated ad-hoc by the NEPSAR contraption.

Figure 10:
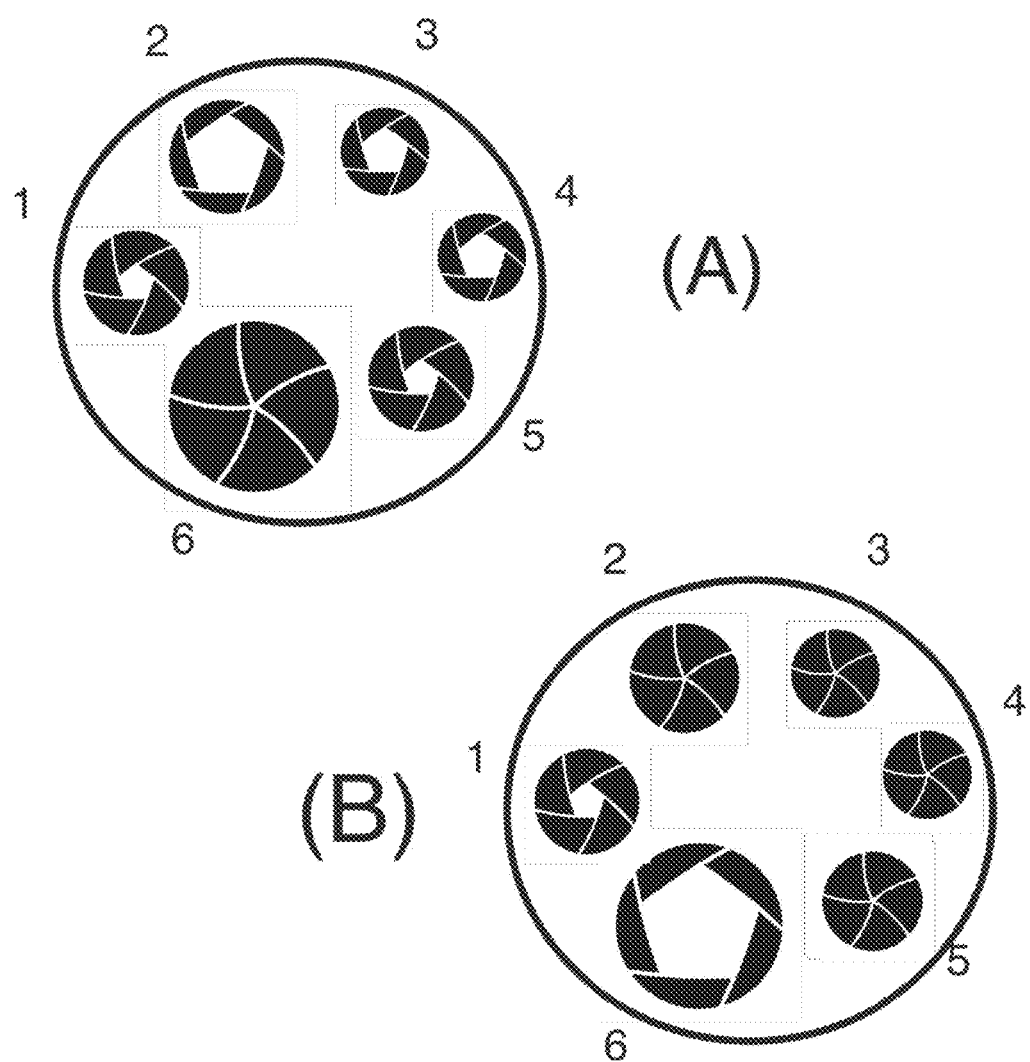

FIG. 10 High Entropy Leaf Adjusted Holes Discs

This figure shows a RandoSol disc with 6 holes where each hole is fitted with a leaf-adjustable opening. This adds another dimension to the entropy of the disc apparatus. A normal hole can be selected to move in a circular fashion in one direction or another and at a given speed of rotation or another. A leaf-adjustable hole like in this figure can also have its status varied by changing the degree of opening of the leaves. In the figure at position A, hole 6 (the biggest on the disc) is completely closed (no hole at all), but in position (B) the same hole is wide open. Similar variations seen for the other holes. These holes can rotate and change their aperture over time, imposing further unpredictability on the measurements in the measurement chamber. The leaves are not strong enough to hold back high pressure, or high viscosity fluids, but they are very effective for gas bubbles going through them.

Figure 11:
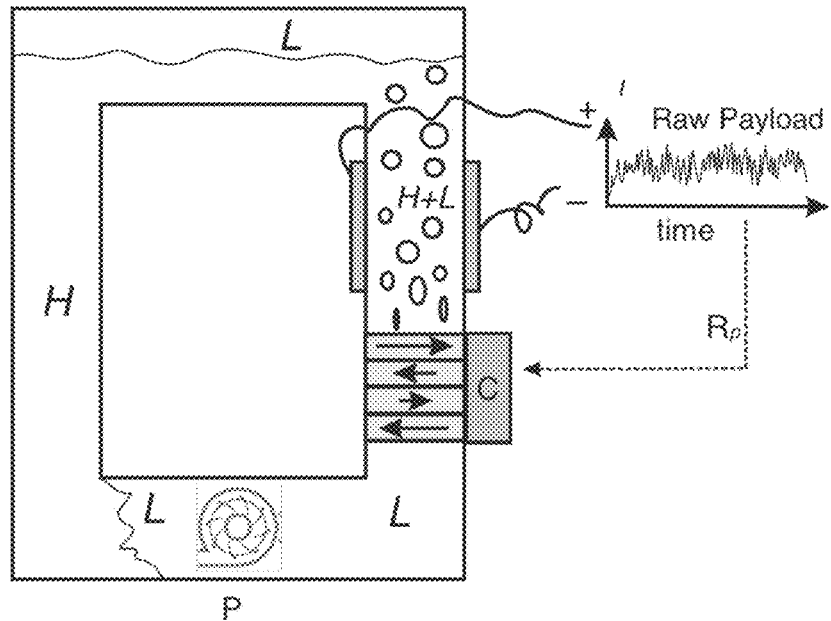

FIG. 11 Vertical Two Liquid RandoSol

This figure shows a closed RandoSol system where a light fluid (L) is pumped with pump P through a stack of rotating discs which are rotating by the control of a disc management center, C. The figure shows bubbles of liquid (L) rising into the measurement chamber identified by two electrodes leading to a time series measurement of the effective electrical resistance between the electrodes. The figure also shows how the reading of measurements over time may be used as a randomized input into the disc control system to keep the discs rotating in a randomized fashion. The figure further shows how the light fluid rises above the measurement chamber into the L-reservoir section from where it is pumped back through the discs to the chamber for another randomness generating session.

Figure 12:
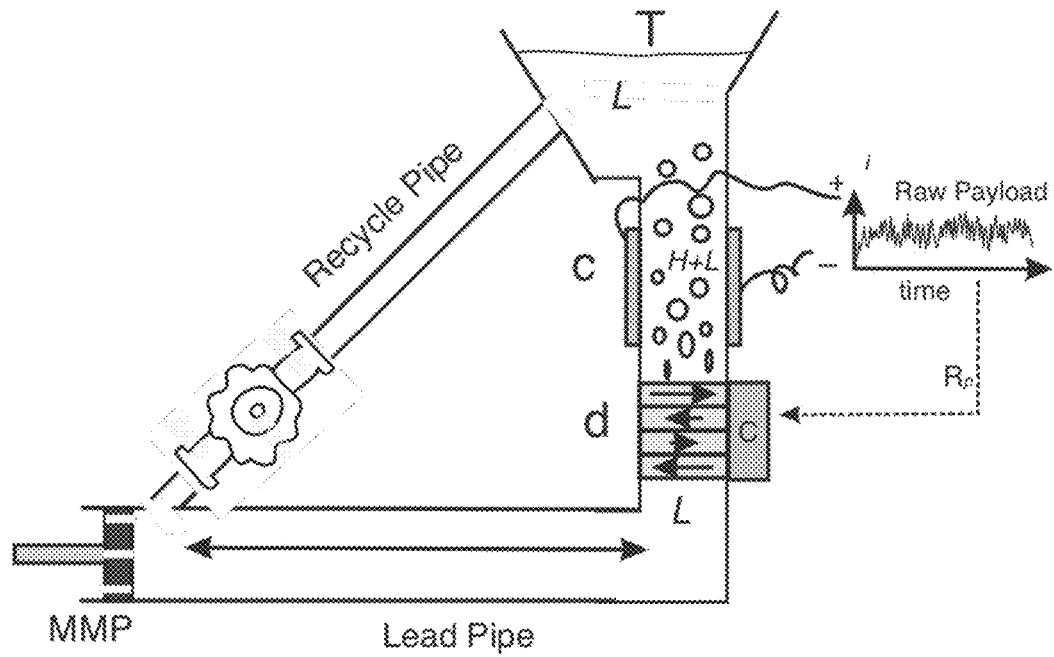

FIG. 12 Vertical Multi Mode Piston, Two Liquids RandoSol

This figure shows a RandoSol apparatus where the pumping of the 2nd fluid, L, through the first fluid, H, is carried out by a multi-mode piston, MMP. An MMP is a piston with passage holes on its fluid contact surface where these holes can be in a closed state or an open state. When the MMP in the picture moves left to right, its holes are closed, and it acts like a regular piston moving the fluid ahead of it forward, in this case towards the rotating discs. When the MMP reached its most right side position, it reverts to open state—its holes open up—and it moves back from right to left. This allows for more light fluid L to flow counter the movement of the piston, through its open holes, so that when the MMP reaches it smost left position, it capture a quantum of fluid ahead of it, ready to be pumped like before towards the rotating discs. For this to happen the holes in the piston are returned to 'closed' position. One movement of the MMP from left to right may be considered a session for randomness generation. The figure shows a recycle pipe where its position as a spill over mechanism is adjusted to be above the level of the heavier fluid (the L-Reservoir) in order to get only light fluid circulating back to the MMP section.

Figure 13:
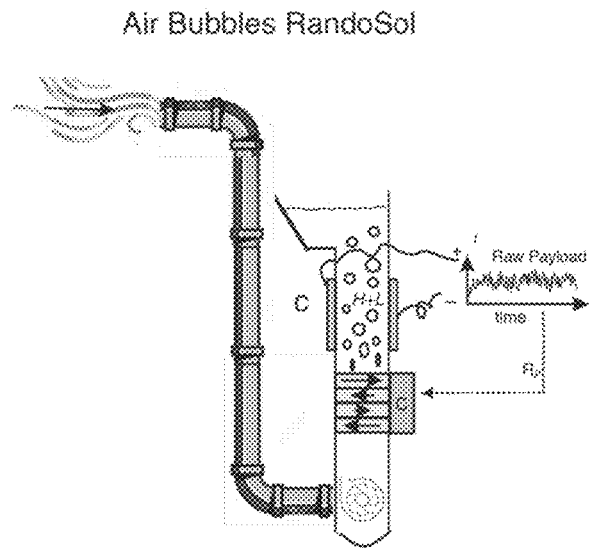

FIG. 13 Air Bubbles RandoSol

This figure shows an open system RandoSol where air is pumped through a column of conductive liquid; the air going through the disc pack to the measurement chamber, randomizing the electrical resistance over time measurement, and then is aired out of the system.

Figure 14:
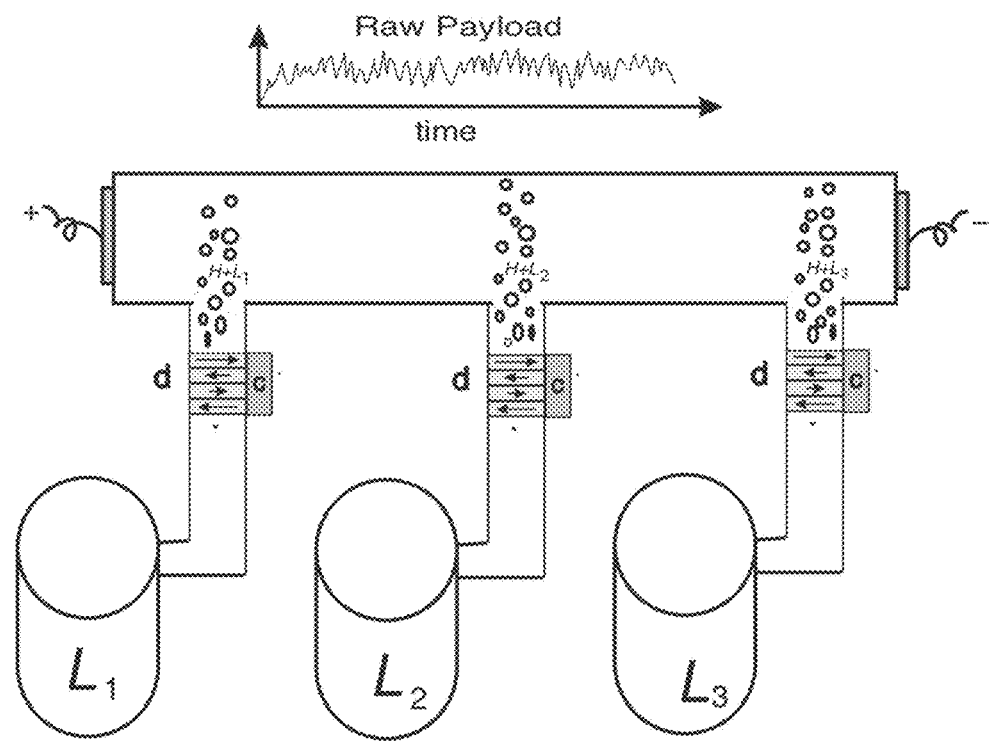

FIG. 14 Multiple Fluid Vertical RandoSol

This figure illustrates a compounded RandoSol where the measurement chamber is fed by a multiple sources of randomized streams of bubbles which may be all of the same (light) fluid, or alternatively, different fluids, as long as the electrical conductivity of each of the bubbles-rising fluid is different from the electrical conductivity of the heavy fluid into which the bubbles rise. The more bubble streams that rise in the measurement chamber, the more entropy for the system, the more possible randomization options, the more difficult for one to 'guess' the construction and operation of the system. The figure shows three light fluids $L_1, L_2, L_3$ fed from dedicated capacity tanks, each through its dedicated stack of rotating discs, which may be different from each other in construction and rotation regimen. The measurement unifies all the multiples sources of electrical resistance variance, and the figure shows (top) the convoluted raw payload. The multiple fluid configuration, as in this drawing, will allow the measurement results to be based mainly on the structure and dynamics of the rotating discs which are rather easy to ensure exactness for them, across the various built systems (in comparison to the harder to control variability of the fluid properties).

Figure 15:
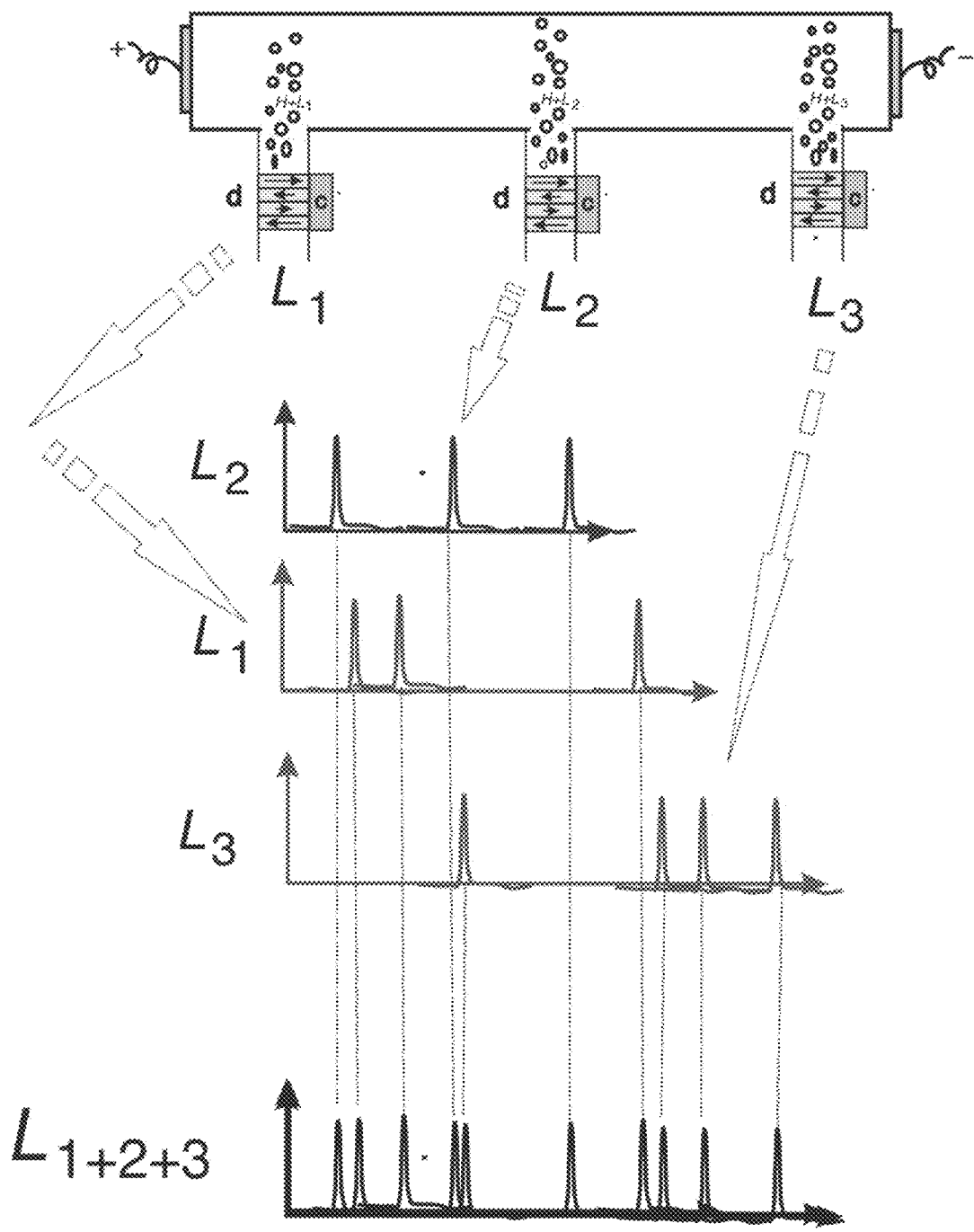

FIG. 15: Randomized Peaks with Multiple Fluid RandoSol

This figure elaborates on the explanations given for the former figure (14). It shows each of the three bubble streams set up as a series of narrow peaks. The figure shows in color the peaks generated by $L_1, L_2, L_3$ separately. However the result in the measurement chamber is the sum total of the peaks from all the bubble stream, as indicated in the bottom part of the figure.

DETAILED DESCRIPTION OF THE INVENTION 1.0 Introduction

Two or more non-strangers remotely situated parties may be limited in their communication to be using public channels of communication, which are exposed to adversaries against which the parties will use cryptographic products which are hinged on shared randomness.

Randomness can be pre-shared, or somehow shared over a secure channel, but very often such parties have only insecure channels for their remote communication and their pre shared randomness is subject to exhaustion. In such circumstances the parties will require a source to generate shared randomness to uphold their ongoing communication needs.

More often than not, such requirement is satisfied through algorithmically generated randomness, alas, as Von Neumann remarked: "Those who use algorithms to generate randomness, understand neither algorithms, nor randomness". One promising source of shared non algorithmic randomness is the quantum physics phenomenon of entanglement. It comes with a limitation: it works only on a party of two, not of more, but more pressing is the fact that the technology is still in development. Only sample cases have been built and it is quite a few years ahead before entanglement will be ready to serve every Alice and Bob aspiring for some privacy.

This defines a pressing need for physical non digitally hackabale source of randomness that is non-entanglement based. This invention presents such a solution.

Ahead we discuss (i) the innovation rational for the invention, (ii) Non-entanglement v. Entanglement.

1.1 the Innovation Rational for the Invention

There are plenty of physical sources for high quality randomness which operate very well, but they are not ad-hoc shareable. Any source of randomness may be pre-shared, and used at a later stage, but such operation has issues: (i) sooner or later the pre-shared randomness is exhausted, and if by then the communicating parties are still in mutual remoteness, then no secure shared randomness can further be used from that source, and (ii) pre-generated and stored randomness may be stealthily hacked. Ad-hoc shared randomness cannot be pre-hacked because it does not exist before it is being used by the parties, and it is shared despite the remoteness of the parties.

Reducing the objective of the innovation to an open-ended randomness generator that is not algorithmic, and is shared when all communication lines are insecure, limits the solution to either (i) hacking detection, or (ii) multi source generation. The quantum physics phenomenon of entanglement satisfies both requirements, randomness is generated at both ends in a coordinated way, and interference of connecting photons or other twin quantum entities is readily detected, but is limited to bilateral rather than multilateral sharing, and is facing considerable hurdles on the road for common implementation. Applying the Innovation$^{SP}$ principles, the innovation challenge is redefined as finding a means to generate on-demand randomness in multiple location over a distance. Applying the Innovation$^{SP}$ breakdown strategy in the 'concentric' mode one is shifting the challenge to generating near-perfect randomness in multiple remote locations.

Theoretical perfect randomness is generated only via quantum physics implements, but suing for less than perfect randomness opens the door for Newtonian (deterministic) physics where randomness is simulated through deep ignorance of the factors that determine an outcome. One is then led to consider a physical contraption that generates a near perfect random output from the standpoint of its output evaluator, by hiding from this evaluator the parameters of the physical contraption that generates this randomness output. And in order to frustrate any viable guessing of such parameters one is led to conceive of a Newtonian contraption characterized by a large number of physical attributes where each of these attributes has an impact on the result of the generated output. The negligible likelihood for guessing the values of the relevant physical factors renders the outcome indistinguishable from perfect randomness. We may note that even with regard to quantum randomness, deemed 'perfect', there is no proof that there are no deep seated factors that generate this outcome in a deterministic mode.

Searching for implementation of this principle one is drawn to the ability of 'nature' to resolve dynamic computation exceedingly faster than human made computers. Such a dynamic setting may be used to generate complexity-built randomness. The fastest dynamics in Newtonian physics is an explosion. One can build an explosion based contraption as follows:

Let some n items be placed on a plate hinged on some legs. Each of the n items is marked with a sign: $s_1, s_2, \ldots, s_n$. On a specific location below the plate one fits an exact measure and shape of an explosive material. The explosive is detonated, and the n items on the plate are tossed about and land at different distances from the center of detonation. Let $r_i$ be the distance where $s_i$ is found after the explosion. By rank-ordering the n items according to their distance from the center of the detonation (and resolving a conflict by direction preference), one achieves an output permutation of the n items. While this output is not theoretically randomized, it does appear so to anyone not familiar with all the determining factors. This setup can be further complicated by enclosing the plate in a bubble that will party destruct and partly cause items to bounce around. By repeating the same arrangement in another location, the results should be the sufficiently same because as both Newton and Einstein have told us: the laws of nature operate the same everywhere.

An explosion is not a very convenient operation to handle on a daily basis, but it does highlight the distinction between nature that resolves all the kinetic equations of motion instantly as compared to a Turing or even a Quantum machine that will require much longer.

One could seek to replace explosion dynamics with fast moving elements in a format that can be easily repeated. The contraption specified in the continued application Ser. No. 17/063,523 "Randosol: Randomness Solution" is a proper physical contraption for our purpose because it is based on fluid dynamics which is highly repeatable and can be operated in a cyclical—ongoing—mode.

Two constructed 'identical' 'RandoSols' as in the above cited application are not perfectly identical and a variation of the output needs to be expected—and dealt with. The Innovation$^{SP}$ methodology at this point shifts its focus to the challenge of overcoming the output variations between two or more RandoSol contraptions built to be as duplicate of each other as possible.

We use the 'breakdown' approach on a parallel mode, figuring out three strategies:
1. physical redundancy
2. data reduction
3. payload sacrifice Physical redundancy strategy calls for each party in the communicating set of parties to be equipped with k physical contraptions, namely k RandoSols. When activating the RandoSol, a party will make sure that the output from all the contraptions is identical, or at least identical enough for the data reduction process to fix the variability thereto.

Data reduction: the objective here is to take two close, but not identical sets of measurements and reduce them without prior coordination to an identical set of data. This challenge can be handled in the Innovation$^{SP}$ breakdown mode on a parallel setting:
lossy regression
quality selection
payload sacrifice Lossy regression is a process where the original large data L is reduced to a smaller data set S (S<L) so that two non-identical but similar versions of L, namely $L_1 \neq L_2$ but $L_1 \sim L_2$ will both reduce to the same S: $S_1 = S_2$, where $L_1 \rightarrow S_1$, and $L_2 \rightarrow S_2$.

Quality Selection calls for identifying in the data to be processed L sections of 'high quality' H, (H≤L) such that while $L_1 \neq L_2$, $H_1 = H_2$, where $L_1 \rightarrow H_1$ and $L_2 \rightarrow H_2$.

The payload sacrifice calls for a shared randomness string S to be divided to a randomized section R<S, which the parties will expose to each other in the open, and if they both have the same value of R, then the balance of (S−R) is assumed to be identical within all the communicating parties. The larger R/S the greater the confidence for sharing the same (S-R) bits.

The configuration that builds itself from these steps will be used by the communicating parties where each is in possession of the same contraption. The parties will exchange in the open the settings for the contraption and run them for randomness (a session of randomness generation). The idea being that actors others than the communicating parties will not be in possession of the contraption and hence will not be able to use the open exchange of setting to also generate the same randomness. Since the generated randomness is not algorithmic, it cannot be hacked without violating the integrity of the possession of the contraption.

1.2 Non-Entanglement v. Entanglement

For several decades now a great international effort has been directed at quantum key distribution. Several methods have been proposed, tried and proven. Yet, this direction is still struggling and far from maturity. There are two main quantum strategies: entanglement, and qbit ambiguity. Entanglement is a most elegant method hinged on the mysterious effect of coordinated randomness between two remote quantum entities. This method requires sustained handling of unstable qubits. Qbit ambiguity was first proposed by Charles H. Bennett and Gilles Brassard (1984), known as BB84. It is based on two parties operating a piece of hardware over quantum entities, resulting in a candidate secret bit string where to fore methods known as information reconciliation and privacy amplification are used to distill a smaller shared secret bit string.

Applying the Innovation$^{SP}$ abstraction analysis on BB84 one describes it as follows: two parties operate private hardware generating candidate data for a shared secret, S*; the parties then process each its version of S*, extracting test data, T, which the parties exchange over insecure channels, and where this exchange allows the two parties to extract from S* a smaller bit string S for which there is a high as desired probability for S to be the same for both parties.

This abstraction description is not limited to a quantum operation. It can be further extended to apply to more than two parties, where each party of a group will operate coordinated hardware to establish the shared secret. The next Innovation$^{SP}$ step is to counter-abstract this description to a non-quantum hardware that would fit into the abstraction framework. This invention is such a hardware designed to generate fresh shared high-quality randomness, secure from adversarial impact.

Quantum information is inherently secure on account of ready detection of eavesdrolping, however quantum states are inherently unstable, and the means to ensure secure communication are complex and quite imperfect.

The need for parties to secure fresh safe randomness is omnipresent and applies to big budget and low budget situations, complex networks and individual conversations.

Accordingly, the complexity of entanglement based sharing does not look attractive over the entire range of use.

This invention is not quantum physics based. It is based on an apparatus of sufficient deterministic complexity that its generated output qualifies as cryptographic randomness.

The NEPSAR is essentially a physical complexity box that can be activated by input randomness, which may be algorithmic, but that uses this input randomless for running its physical complexity from which it generates its output randomness, claimed to be unhackable on account of the hackers being in the dark with respect to the physical apparatus that generates the same randomness for all involved parties.

2.0 The Operational Configuration

The NEPSAR system is designed to use two or more of physical randomness generators (PRGs) each used by a communication party, so that the parties agree on a random bit series (payload) based on physical complexity as a means for the parties to share a random bit series, which is essential for virtually all cryptographic protocols.

Physical gadgets like the PRG are not absolutely identical. The data that is extracted from each PRG (the raw payload) is also not identical and hence the NEPSAR system needs means to extract identical bit series (ready payload) from non-identical raw payload measurements of the various PRGs.

NEPSAR is using for that purpose a mathematical process of variation elimination, so that n raw payload data $L_1$, $L_2, \ldots L_n$ where $L_i \neq L_j$ for $i \neq j$ for $i,j=1, 2, \ldots n$ are reduced to corresponding ready-payload data: $S_1, S_2, \ldots, S_n$ such that:

$S_i = S_j$ for $i,j=1, 2, 3 \ldots n$

Because the $S_i$ values are not compared, then NEPSAR is essentially a probabilistic operation, where the users can reduce at will the chance that the S values will not be identical.

2.1 The NEPSAR Framework

The NEPSAR framework is comprising n communication parties: where each party i (i=1, 2, ... n) has at its disposal $k_i$ physical randomness generators that are built to be as identical as possible throughout all their users. Each physical randomness generator PRG is subject to particular setting parameters to guide its output of randomness—the raw payload.

At an arbitrary time communicator i will initiate an operation resulting in a shared randomness R, which will be generated by all the n communicators.

This operation has the following parts: Self-Test, Community Test, Probability Assurance.

2.1.1 Self Test

The initiator party i will decide on setting Ŝ for the PRG, then activate the $k_i$ RPG at its disposal to generate from each the raw payload: $P_j$ for $j=1, 2, \ldots k_i$.

The $k_i$ raw payloads will each undergo the Variety Elimination Procedure (VEP), to generate the ready payload, P. The initiator will then check that all the ready-payloads $P_j$ for $j=1, 2, \ldots k_i$ are the same: $P_j=P_l$, i, l=1, 2 \ldots k_l$ If there is no sufficient equality of the $k_j$ payloads, then the initiator will change the settings and re-activate the PRG. When all ready-mode randomness outputs $P_j$ for $j=1, 2, \ldots, k_i$ are sufficiently equal to each other the self test is done. All the communicators will report the result of their self test. If all n self tests are successful, then the self test is done.

If one or more communicators claim that the settings did not work over their set of PRGs, then by procedural choice or by a preset manager of this NEPSAR operation it will be decided on whether one of these claimants will be tasked as being the new initiator, and try to achieve a successful community test this way. Or the communicators who did not get ready payload, will discard one or more of their PRGs, to achieve a successful community test over the original settings S.

2.1.2 Community Test

Following the self test the parties will carry out a community test. First they will report to each other the number s* of randomized bits they extracted from the raw payload. If this count differs for even one party then the entire randomization process starts again.

If all the n s* counts agree then each party reports which of the s* randomized bits they found to be hard to determine their identity. Every bit out of the s* for which even one party found it difficult to determine its identity then that bit is removed from S* list, to generate the S list of size $s \leq s^*$.

2.1.3 Probability Assurance

At this point all the n communicators hold a ready randomness R, which they expect to be identical among them. They will now decide to apply probability assurance to this expectation. This assurance will operate as follows. Let the ready randomness, R be comprised of r bits. The communicators will randomly select d bits to be disclosed, and compare their values. This leaves a smaller randomness R* comprised of $r^*=r-d$ bits as working payload. If any of the disclosed d bits is not in full agreement within the community then the entire operation starts from the beginning.

If all the d bits are agreed upon per their value among the n communicators then, the community operates on the premise that the r* bits of the working R* are properly shared among the n communicators, ready for any cryptographic operation that requires high-quality shared randomness. The communicators will decide on the desired level of assurance: the larger the value of d, the greater the confidence that the r* bits are properly shared.

2.2 Discrete NEPSAR

NEPSAR can also be operated in a discrete mode, as follows. The t discs of the NEPSAR disc pack are divided to d angular divisions, where each division is defined as the area within to radii, and an arc portion between the edges of these two radii. The d divisions cover the entire area of the disc. The angular measure of each disc division is $2\pi/d$. Each disc division is divided by a–1 concentric arcs to a 'hole' sections. For a total of ad hole sections. Each hole section may be cut out (become a hole), or stay put. So each division may be "holed" in $2^a$ ways, and the entire disc in $2^{ad}$ ways, and the whole stack of t discs in $2^{adt}$ ways.

The discs will rotated in a discrete fashion, namely each disc can be rotated to d states. Each rotation amounts to shifting the divisions in a circular way.

The whole stack of t discs can be in td states.

when the stack is in a particular state out of the td states, it has a definite passage area for the light fluid to rise up (using the vertical disposition, but it applies to other dispositions too).

In the discrete mode there is a mechanism to prevent flow. It may be a regular valve on the input line of the light fluid, or it may be two extra discs to the pack such that each of those extra discs has a 50% opening (hole area) such that these two discs can be configured to allow full flow 50%+ 50%=100%, or zero flow: 50%-50%=0%. Either way one envisions the discrete RandoSol as an apparatus where in the opening state the light fluid is not flowing, and therefore the curve measuring the electrical resistance in the measurement chamber is flat—no change in the resistance. Then the disc pack is put in one of the possible td states. Once done, the flow of the light fluid is allowed for a period of time, θ, after which the stop flow is reapplied. The θ period is called a 'shot'. During the shot, the light fluid rises through whatever passage area is available to it through the stacked up discs, a bubble or several bubbles of light fluid at a total amount b is rising up to the measurement chamber. The greater the passage area and the longer the period θ the greater the total size of the bubbles, b, and the greater the impact on the resistance curve in the measurement chamber. This impact is in a form of a peak that rises and disappears as the light fluid flow dies off.

Since the passage area and the duration of the shot are easy to construct with great similarity among the parties, one would expect these peaks to be of same mutual intervals, and of same relative heights of these peaks, as they appear in far away apparatuses.

The number of discs, the degree of hole-surfaces can be adjusted so that the likelihood for bubble formation will be such that for each shot there will be a corresponding peak. By spreading the location of holes in each disc in a random fashion, and by randomly deciding the shift position for each disc, one passes on this randomness to the sizes the peaks. Peaks of various sizes will easily allow for extraction of a binary string where, for example, for a peak higher than its predecessor, the identity will be '1', if the peak is lower than its predecessor, it will be given the identity '0'. If the peaks are of same or similar height then the peak identity will be undecided. The decided peaks (bits) will be the same in every apparatus the process operates.

The contraption as described can be built with very few holes, so that the chance for holes to overlap over a large number t of discs will be negligible. In that case the resistance-time curve will be flat—undisturbed, no bubbles, this is a 'zero bubble option'. Albeit one could construct the discs such that almost all the discs area will be "holes". In that case no matter what shift position each disc is placed, the quantity of bubble material will be maximum 'the full bubble option'. For any hole situation between these two extremes (zero and full options) the size of the peak, or say the quantity of light fluid that emerges through the discs will be between these two extremes. And again, to the extent that the holes distribution is randomized and the shift positions for the disc pack is randomized, so is the distribution of peak heights.

Say then that the designer can determine the average percentage of holes-area for the disc pack to place the contraption somewhere at the middle point between the zero situation and the full situation, and this will allow for maximum range for randomization around some mean value.

The variability of this system as described with fixed d divisions for each disc, and t discs is $d^t$ possible states. So for d=32, and t=8 there are $32^8=1.1*10^{12}$ possible states.

This already high degree of entropy can be further increased by the following means:
1. division variability
2. more shift positions
3. pressure variability
4. multiple streams Instead of having each disc divided to d divisions, one could divide each disc to a different number of divisions, and even a given disc may be divided to uneven divisions.

The number of shift positions may be independent of the number of divisions in a disc, a larger number.

The RandoSol contraption may be operated on a positive pressure over the penetrating fluid rather than rely on gravity. This positive pressure P may be mapped to p pressure values, to be selected randomly. Clearly given the same passage area, if the positive pressure is greater, the size of the bubbles is higher.

The multi-stream options described above can readily be applied for the discrete RandoSol thereby creating a still larger variety.

2.2.1 Application Protocols

The discrete NEPSAR can be used in various protocols, like:
1. show-no-show
2. peak size Show/No Show Here the idea is to adjust the holes area and the number of discs so that for every statee of the disc pack there would be about a 50% chance for a bubble to emerge from the pack. By running the apparatus many times, the recording of whether a bubble showed up or not would be translated to a randomized bit string.

Illustration: Let there be 8 discs each divided to 16 "pie slices", and within each slice there are 8 concentric area locations where each area may be a hole or not a hole. Let us randomly assign each area to be a hole or not a hole at a 50% chance for each option. Given a hole area in disc 1, the chance that at a given state all the corresponding areas on all other 8 discs will be a "hole state" is $(0.5)^7=0.008$. There are 16*8=128 such holes on the first discs, half of them are hole-areas, namely 64 holes on disc one. Each of these 64 holes has a chance of 0.008 to be associated with holes through the other 7 discs, so the chance that one of those holes will become a fluid passage area is less than 0.008*64=0.5. This means that for every shot there is a 50% chance for a peak to be marked on the resistance-time curve and a 50% chance for no disturbance. By designating bubble show case, as 1 and a no-show as 0, one extracts from the raw payload of the discrete RandoSol operation a randomized binary string.

Peak Size

By adjusting the chance for a shot to be considerably higher than 50%, one also increases the chance for two or more bubbles to be emerging from the disc pack into the measurement chamber. This will result in a greater peak as recorded on the resistance-over-time curve. The size of these peaks may be a basis for extracting a binary series from the ray payload. E.g. if a peak if larger than its predecessor it is one; if it is smaller than the predecessor it is zero. If unclear it is marked as 'undecided', and then handled through the community reconciliation.

2.3 Variety Elimination Procedure

There are many algorithms that would eliminate variation among data elements to turn them into a derived data element that is the same for all instances of variations. The need for us here is to process the raw payload into a ready-payload under the assumption that apart from small random variations the various instances of raw payload are the same. (Recall: the raw payload is the function that measures the electrical resistance in the measurement chamber over time).

The exact nature of the variety elimination procedure is best determined with respect to the exact nature of the raw payload. In this invention we reference the continued application, where the raw payload is a time function f(t) indicating electrical flow over time. In a more general way the raw payload can be represented as a relatively large string of bits, L, where the ready-payload is represented as a smaller bit string S. In other words, the operation L→S is a hash function. Alas, it is with opposite aims to regular hash. In a regular cryptographic hash one wishes for the hash (S) to be completely different, even if only few, or one bit is flipped in the large data set (L). Here, we may call it Ortho-Hash (H*) the objective is the opposite. One wishes the hash S to stay the same over minor variations in L.

Ahead we discuss (i) time series variation elimination and (ii) ortho-Hash.

2.3.1 Time Series Variation Elimination

We consider an 'oscillating' time series where a local maxima follows a local minima, which follows a local maxima. We mark the time spots of the local minima by order: $m_1, m_3, \ldots m_{2i+1}$, and the corresponding local maxima by order: $m_2, m_4, \ldots m_{2i}$.

We now extract a binary series from this time series $b_1, b_2, \ldots$ as follows:

---

If $(m_i - m_{i-1}) > (m_{i-1} - m_{i-2}) + a$
then $b_i = 1$
If $(m_i - m_{i-1}) < (m_{i-1} - m_{i-2}) - a$
then $b_i = 0$

--- otherwise $b_i = x$, where x indicates an undermined value, a is an arbitrary value used to focus on large variations.

This operation results in a series of n bits marked each as '0', '1' or X. This series is called the ready-payload series candidate, S*.

When a community of k communicators use a physical randomness generator that creates a random time series, it is expected that each communicator will have a slightly different-time series:

$$f_1(t) \sim f_2(t) \sim \ldots \sim f_k(t)$$

Each of the communicators extracts a bit series from their time series (over the same interval 1–h).

The communicators first share the number of bits in their extracted string. If the number of bits is not the same for all communicators then the communicators start again. Or alternatively it applies a 'smoother' operation over the time series (as elaborated ahead).

Once the k communicators agree on the size of their respective S* series:

$$|S^*_1| = |S^*_2| = \ldots |S^*_k|$$

They proceed as follows: Each communicator prepares an 'X-resolution' bit string S** based on their payload-ready candidate, S* bit string. An X-elimination string, S** is a string of bits where each bit that was marked 0, or 1 in the respective S* series is now marked Y, and each bit that was marked X in the respective S* series, remains marked X. The result is a bit series represented by a series of letters Y and X.

The X-elimination strings, $S^{}_1, S^{}_2, \ldots S^{**}_i$ are compared in the open among all communicators.

Every bit marked 'X' in any of the k series ($S^{}_1, S^{}_2, \ldots S^{}_k$) is marked X, on all the series. This will render all the S series into the same Ŝ series (X-resolution series).

$$\hat{S}_1 = \hat{S}_2 = \ldots = \hat{S}_{2n}$$

Illustration: Let $$S^{**}_1 = YXYXYYYXY$$

$$S^{**}_2 = YYYXYYYYY$$

$$S^{**}_3 = XYYXYYYXX$$

The respective X-resolution series, Ŝ, series will be:

$$\hat{S} = XXYXYYYXX$$

If the Ŝ series has not any Y left or two few bits marked Y, then the entire variety elimination process starts anew. The communicators agree on a different value for a, or apply smoothing on the processed time series (as elaborated ahead).

After securing the same X-resolution series, each communication party will construct its shared secret bit string S, by replacing the Y values with the 0 or 1 value that was assigned to that bit before it was marked Y. All the bits marked X are eliminated.

The parties, now, each possess its shared secret bit string S, for which it is expected that it is the same across all k communicators:

$$S_1 = S_2 = \ldots S_k$$

The Smoother Algorithm: Given a time series f(t), defined over an interval of time (1–h): 1<t<h, we define a smoother algorithm S to generate a 'smoother' function f'(t,a) defined over the time interval t=1+a, to t=h−a as follows:

$$f'(t) = \int f(t) dt / 2a \ldots \text{from } t-a \text{ to } t+a$$

where the integration applies to full interval of f(t,a)

Smoothing can be applied iteratively as many times as desired, given the limitation of the shrinking interval.

For $a \rightarrow 0$, $f'(t) \rightarrow f(t)$

For $a \rightarrow 0.5(h-1)$, $f'(t) \rightarrow$ the average value of f(t) over its interval.

By its definition the smoother algorithm reduces variety and flattens curves.

2.3.2 Ortho-Hash

Given a large bit string L. One may wish to extract from it a smaller string S such that for a string L'≠L, but not 'much different' from L (L~L') the extraction will generate the same smaller string, S.

$$L \rightarrow S; L' \rightarrow S$$

Among the many ways for doing so we discuss the following: grouping

Grouping

Let string L be comprised of l bits. Let us group together g bits at a time by order, to define h groups, with a remainder section comprising d<g bits:

$$l = g*h + d$$

Let m be a majority value, such that if in a certain group the number of '0' exceeds the number of '1' by m or more, then one assigns the value '0' to this group. Symmetrically if the number of '1' instances in the group exceeds by at least m the number of '0' then the group is assigned the number '1'. Groups that are not assigned by either '0' or '1' are assigned 'X'.

Following the above definition the string L will be reduced to a string S comprising h elements: 0,1,X.

The groups marked X are discarded, resulting in a series S comprising s<h bits.

By construction it is clear that the hash string S will remain invariant over small variations in the original string L.

The values of g, and m are to be determined according to the notion that the larger the size of S, the greater the chance that not all variations will be eliminated, but the smaller the size of S, then less data would be extracted from L. Let k parties each having a raw payload $L_i$ for i=1, 2, ... k such that $L_i \neq L_k$ and $L_i \sim L_j$ for i,j=1, 2, ... k. Each party reduces their raw payload to a string, S* comprising 0,1, and X.

Each party will then prepare an X-elimination string S** by replacing all 0 occurrences and all 1 occurrences with Y. The X occurrences will remain unchanged.

The parties will then share their respective X-elimination strings. Every group for which any of the parties had marked as X is to be removed, leaving only the groups that are marked Y in S**.

Each group will then replace the Y marking with '0' or '1' as these groups were marked before, and thereby every party will hold the same ready-payload, S.

If there are no groups that survived the X-elimination process then S='', then a new attempt is to be conducted, changing the values of g and m.

Illustration
L=11000011010000101111011101101100000, let g=7 and m=3, we divide

11000011010000101111011101101100000→$S^*=X$0110

Checking for
L'=11010011010000100111011101101110000

11010011010000100111011101101110000→
$S^*=X0X$1 0

Both parties will prepare their version of the X-elimination string:

$S^*_1$=XYYYY;$S^*_2$=XYXYY

The parties compares the X-elimination lists (in the open without disclosing the values behind the Y markings). They conclude that X appears in both cases on the first group of 7 bits, and in one case on the 3rd group of 7 bits, so the parties agree to discard group 1 and 3 and are left with three groups (2,4,5).

Now both parties hold the same ready-payload S=010.

2.4 Verification

NEPSAR operates in sessions. A session is an interval of time when bubbles are rising before they stopped. A session has a starting time and a finish time. During the session the process generates a string comprising S* bits. This string is the 'randomness candidate'. It is of length s*=|S|. The communicating parties may share secretly or in the open the value of s*. If there is no agreement on this value, the process starts again. (new parameters assigned, new session begins).

Once the value of s* is agreed upon across the board (through all the participating communicators), each party identifies a list of these s* bits for which it is not very sure as to the identity of these bits. Let $D_i$ be this 'doubt list' issued by party i out of k participating parties. The parties each identifies its doubt list. Any bit out of the s* which any party has doubt about is off-listed. This will reduce the S* list to S of size s=|S**|≤s*. S* then lists bits for which each party is confident to have identified its identity correctly.

The next step is for the k parties to publicly share t bits out of S**, and compare their identity. Unlike the case with BB84 where one party communicated random data to the other, with NEPSAR there is no communication between the parties as to the shared secret, so no fear of eavesdropping, nor of errors in transmission. Any inconsistency of the identities of the compared t bits is due to unscrubbed variations from the raw payload, a case which indicates failure and call for the parties to try again. (new operating parameters, new session).

In some cases the shared secret will be used for standard cryptographic keys for say AES and other plaintext-committed ciphertexts. In that case the parties will soon find out that they 'don't use the same key. And therefore the value of t can be relatively small. We note that the higher the number of test bits, t, (the more payload bits are being sacrificed), the greater the confidence that the s**-t bits will be of shared identity across the board of communicators.

In cases where it is more difficult to realize that not the same key is used, the value of t will be higher.

When the process is done the t sacrificed bits are removed from S resulting in the final product of this particular random session, S, of size s=|S|=s-t.

2.4.1 Feedback Based Verification

The final verification method described above calls for payload sacrifice, t bits are used for building confidence regarding the remaining s-t bits. An alternative method calls for using the s string as randomness guide for activating the RandoSol-apparatus. Let $R_i$ be the randomness generated by party i out of the n parties, when this party used its version of the shared secret $S^{}_i$ as input source for its RandoSol machine, the machine generates output randomness, $Q_i$ for each party i. The $Q_i$ values may be shared in public. Their agreement proves that agreement of the n $S^{}_i$ values.

This feedback verification requires an exact application of $S^{**}_i$ on the RandoSol apparatus.

2.4.2 Failed Verification Protocol

If a protocol fails occasionally, one simply tries again, hoping for success. Alas, if failure becomes frequent the parties need a strategy to secure success. We describe three such strategies: (i) shorter sessions, (ii) lower mixing, (iii) interval based bit extraction.

Shorter Sessions: the RandoSol operates as a succession of sessions. A session starts when the discs are put in motion, and soon after the stable electric resistance reading is disturbed by the first bubble, and it ends when the last bubble rises above the measurement chamber and ushers in a new stable resistance time. The operator controls when to start rotating the discs and disturb their status of no-passage area, (the pre session and the post session states) and similarly the operator decides when to return the disc pack to a state where all the holes cover for each other and there is no passage area for the bubbles to go. Between these start and finish point there stretches the session with all its ups and down generating the raw randomized payload. By making these sessions shorter there is less room for deviation and variance.

Lower mixing: when the discs allow for large fluid passage area, the flow depends more seriously on the exact properties of the fluid, like electrical resistance, specific gravity, and viscosity. While the various contraptions use exact specifications fluids, there is more variance there then in the size and speed of the discs, it is therefore helpful, to apply passage-area strategy with small infrequent passage area states, so that the raw payload resistance time curve looks as a horizontal line disturbed occasionally by a peak generated by a rising bubble. The timing of this peak may be made the key to extracting the randomized bit string from the curve. This timing depends virtually totally on the geometry and motion of the discs and it is not sensitive to small variations in the properties of the fluid.

Interval based bit extraction: this method is especially useful if the bit count of the extracted bit string candidates are not in mutual agreement. Since the total time of the session is in exact control of the apparatus operator, one could divide the session span to a pre agreed fixed number, I of intervals, and then devise a method to extract a bit one or bit zero from the way the resistance over time curve behaves within this interval. (i) One could count the number of peaks, (ii) one could compare the highest point in a given interval to the highest point in the former interval and based on this comparison identify the bit for this interval as one or zero. Various other methods are available.

3.0 RandoSol Implementation

In search for a physical source of randomness that can be duplicated any number of times and generate the same randomness for all, one is first outlining some essential features.

The source of physical randomness, as it is not quantum based, is left to be deterministic physical complexity. A situation where a measured parameter depends on a large variety of factors that are embedded in the physical device that generates the randomness.

The continued application Ser. No. 17/063,523 "Randosol: Randomness Solution" describes an apparatus that generates randomness over a time series representing electrical current flowing through a fluid medium through which a second fluid flows where the two fluids have different electrical resistance. Hence the measured resistance over a mix of the two fluids depends on the proportions of the fluids and their relative disposition. This mixing state, in turn depends on properties of the fluid, properties of the container of the fluid, and properties of the forces that effect the mixing. Given the details of all the controlling factors, the results depend on a well engineered complexity defying any attempt to consistently guess, or predict the outcome.

Our aim here is to take this concept for complexity randomness to a setting where it can serve as a generator for randomness shared by two or more remote parties, each operating a duplicate of the physical randomness generator.

The requirement of this upgrade to serve shared randomness must include variability. That means that the apparatus must be operational under different settings so that each time the generated output will not only by sufficiently random, but also be sufficiently different from other instances of generated randomness from the same source.

A mixed fluid apparatus as described above and as described in the continued application will presumably use the same fluid container for all instances of generated randomness, therefore the variety will have to come from the attributes of the mixed fluids and of the attributes of the mixing mechanism.

The RandoSol described in continued application Ser. No. 17/063,523 may be used with many possible fluids, that may be replaced at will. Alas, fluid replacement is more cumbersome then adjusting the parameters of the mixing mechanism. So we strive to build the RandoSol so that setting of the mixing mechanism will generate a sufficient variety of high quality randomness.

The idea of RandoSol is to mix two fluids of great difference between their electrical conductivity. In a common embodiment the two fluids also have a great difference in their specific weight, so that pumping the light fluid into a bulk of the heavier fluid will create 'light bubbles' that will change the electrical resistance between the two side walls of the mixed-in bulk (the mixing chamber). To the extent that the rising bubbles are 'chaotic' so will be the result of measuring the effective resistance over the measured bulk over time. If the measurement voltage is kept constant then resistance fluctuations are as random as electrical current fluctuations.

We conclude then that we seek a bubble generator of chaotic—randomized output. The rising bubbles must emerge from a temporary hole through which the light fluid passes towards the bulk of the heavier fluid. To the extent that these temporary holes are randomized—so is the flow of rising bubbles, and hence the reading of current over time.

The output of the light fluid to the heavier fluid through the hole depends on (i) the size of the hole, (ii) the shape of the hole, and (iii) the time the hole was on (open). We therefore are aiming to construct an apparatus where holes of different sizes, different shapes, of different timings (open and close) are used by the light fluid to rise through the bulk of the heavier fluid.

In addition we seek to implement RandoSol, without reliance on gravity, rather through positive pumping of one fluid into the other through a stack of rotating discs with various holes.

There are various means to achieve this three-dimension hole variety (size, shape, timing). We here describe further one embodiment to achieve the declared aim: A Stack of rotational hole-drilled discs.

3.1 Stack of Rotational Hole-Drilled Discs

We construct t hole-drilled rotational discs that are stacked together on an inner axis of the vertical cylinder containing a light fluid. The discs can be rotated in various speeds and in any of the two directions—each disc independently from the others. At least two of the t rotating discs have holes in a such a way that these discs can be set in rest so that all the holes in one of the two discs will be covered by no-hole area in the other disc. Such a configuration will create a no-flow state, where no bubbles rise, no matter what happens with the other t−2 discs. (This implies that t≥2).

The discs are drilled with holes of varying sizes, varying shapes, and varying locations on the discs. If all the t discs are packed as a vertical stack such that the lighter fluid is below and the heavier fluid above, then when these discs are rotated, each in its own direction and its own speed, then at various moments there are different passage ways for the lighter fluid to rise through the stack and mix with the heavier fluid. The actual passage area is dynamic, it changes as the discs keep rotating, each in its own direction and pace. To the extent that the drilled holes are randomized as to size, shape, and location, and to the extent that the motions of the discs are randomized as to direction and angular velocity, the flow of light fluid bubbles from the bottom of the stack to the top pf the stack is similarly random. And to the extent that the mix of the light fluid and the heavy fluid is therefore randomly fluctuating, that is the extent to which the measurements of effective resistance of the mix of fluid (in the measurement chamber) is also a randomized function. It is this randomized function that each party processes over its own apparatus, in order to extract from it a shared random bit string.

To replicate the random series, these NEPSAR apparatuses will have to be built as exact duplicates, and similarly the properties of the heavy and light fluid will have to be well defined and be sufficiently the same for all apparatuses.

The lighter fluid, L, can rise through gravity in the bulk of the heavier fluid, H, or a pump may promote the rate of circulation.

3.2 Randomness Sessions

The NEPSAR apparatus will be run as a series of randomness sessions. Each session starts and ends with the measuring volume filled with the heavy fluid, which is more (or less as the case may be) electrically conductive than the lighter fluid. These start and finish states show an effective resistance $T_0$. These states are accomplished by setting the stack of rotating discs to a position where there are no holes for the lighter fluid to go through. All the lighter fluid, L that passed through the measuring chamber has risen above that chamber to a volume that is set up to absorb the rising light fluid.

When the session starts, the stack of rotating discs is activated, and each disc is rotating according to a stack rotation plan. As rotation commences, some passage area for the light fluid is dynamically formed through holes overlaps of the moving discs. The light fluid rises through these holes at a rate determined by the size of each hole at any given moment, by its shape, and by the force that propels the light fluid up. As the discs rotate the passage area and shape for the light fluid to go through changes. As the light fluid rises towards the measuring chamber, the measurement of the effective resistance across the chamber is changing because the rising light fluid takes volume between the measuring electrodes, and this volume is of different electrical resistance so the overall measurement of time dependent resistance changes beyond $T_0(t=0)$, to $T(t=t_1)=T_1$, where $T_1 \neq T_0$.

As the flow of the rising light fluid changes in response to the changing passage way through the stack of discs, so does the measured value of the resistance across the chamber.

To the extent that the drilled holes in the discs are random, the rotation of the disc is random, then the rate of rise of the light fluid is also random, and therefore the measurements of effective resistance across the measurement chamber is also a random series. In other words $T(t)$ is a random function.

At a time point $t_f$ the session is finished. This is brought to pass by setting the stack of discs to be again is a state of zero passage. No light fluid comes up. Very soon after this blocking state, the en route light fluid bubbles are rising above the measurement chamber which is again filled only with heavy fluid, and its resistance returns to $T_f = T_0$.

In summary then, a randomness session, is a time period, $P = t_f - t_0$, in which the time dependent resistance measured over the measurement chamber changes randomly through an overall change and a subsequent return from a base measurement, $T_0 = T_f$. The randomness in the engineered flow of the light fluid expresses itself in randomness of the measured resistance. The challenge is to extract bit string randomness out of this series of measurements in a way shared by various operators of duplicates of this NEPSAR apparatus.

The extent to which the hole dynamics is the prime factor that determines the flow pattern and hence the resistance pattern, is the extent to which the various parties operating duplicate apparatuses will extract the same results.

The more discs there are, and the smaller their holes, the less passage area will be created over a certain period of time, and vice versa. We examine ahead the two modes of operation: low mix and high mix.

For a set of t discs with fixed holes in each, one can rotate each disc i with an angular speed over time $w_i(t)$. This defines a vector of function: $W(t) = \{w_1(t), w_2(t), \ldots w_t(t)\}$. The rate of passage of the light fluid through the stack of discs, is given by $L(t)$. The electric resistance T depends on $L(t)$, which in turn depends on $W(t)$: $L(t) = f(W(t))$. $T(t) = f(W(t))$. Since the discs are constructed such that in certain alignments there is a flow of light fluid, and at other alignments of the discs there is no flow, it is therefore necessary for $T(t)$ to be randomized, given that $W(t)$ is randomized.

We can thus view RandoSol as a 'randomness transformer'. It accepts randomness applied to the rotating discs, and it generates randomness applied to the measurement of resistance of the mix of two variable resistant fluids. The transformation from input randomness to output randomness is carried out by the structure of the apparatus. It depends on holes drilled in each of the rotating discs, it depends on the pressure under which the light fluid rises up; it depends on the geometry and the structure of the resistance measurement chamber. So to the extent that all these factors are unknown to an adversary, we can say that even if an adversary finds out the input randomness ($W(t)$) they cannot deduce the output randomness $T(t)$, because of the unknown complexity of the apparatus.

We note that if the apparatus is designed and operated such that an event of escape of light fluid upwards to the measurement chamber is relatively rare, then the determinant factor will be the way the holes are drilled in the discs and the way the discs are rotating. When it is relatively rare for the discs to align themselves so that a bubble of light fluid (with different electric resistance) escapes to the measurement chamber, then different chambers of slight construction differences will all show similar timing for peaks (or reverse peaks as the case may be—depending if the light fluid is of lower or higher conductivity relative to the heavy fluid) in resistance. In other words, making escape 'a rare event' will neutralize differences between similarly constructed apparatus and hence such a configuration is advantageous for shared randomness. The disadvantage is that the rate of randomness generation is low, compared to a situation where normally lots of light fluid flow up and randomness is measured by the changes of the flow and hence changes in the resistance. There is a greater chance for variability between devices for the high flow regimen as opposed to the low flow regimen. It is therefore that when the NEPSAR is operated one strategy calls for one to start with low-mix, low randomness quantity output, and then increase the mix level and the randomness quantity output until such a state where different apparatuses each generates randomness not exactly as the other. This state will be identified in practice. What is important is that one can reduce the flow rate to rare bubbles so that the randomness generated by the various devices held by the various communicators will yield the same randomness sequence—which is what we aim at.

Suppose that on average for a particular rotating regimen of the discs a bubble escapes every x seconds. Then if the regimen, $W(t)$ is randomized then the time difference between one bubble and the next will be given by $X \pm \Delta X$, Where the actual measurements are randomized (namely $\Delta X$ is or random distribution). This will be the shared randomized series among the communicators.

3.2.1 RandoSol Operational Balance

The essence of the subject operation is the exploitation of physical similarities among distinct apparatuses, to generate the same data pack from all of them. This data pack should be unavailable to anyone not in possession of the apparatus that generates the data pack. Moreover, it should be hopeless for an adversary to guess the data pack. This resilience is achieved via the complexity of the apparatus. Complexity is secured through minding more and more minute features of the apparatus and the operation. Alas, at some point of dependence on minute features, the slight differences between the various apparatuses will play a role, and cause a non identical data pack to be generated, which is contrary to the aim of the operation. On the other hand by abstracting the apparatus too much, we increase the risk of adversarial guessing of its structure.

This defines the essential balance of the NEPSAR operation. The natural strategy is to start with abstraction of the apparatus and then add on more and more fine features as long as the various generated data packs are identical, or can be made identical by various comparative means as defined herein. The more detailed features of the apparatus are used the more secure the operation. It will be the practical challenge for the parties to experiment with as many detailed features as possible.

3.2.2 Disc Regimens

We consider here a few specific disc regimen, representing the rich variety embodied in the RandoSol setup.
1. Two Rotating Discs one hole each
2. Many rotating discs (large holes)
3. holes variability options Note: the analysis ahead describes a gravity based motion of a light fluid into a heavy fluid, but it applies equally for a positive pumping pressure allowing for one fluid to penetrate into the bulk of another.

Two Discs Rotating Discs one hole each: We first analyze the case of two small holes, one hole per disc. When the disc rotate, most of the time there is no passage for the fluid upward, because it is relatively rare for the holes to be in a matching position allowing fluid to pass. When this happens a bubble of light fluid rises and as it reaches the measurement chamber, it gives a peak of resistance uptake, (assuming the light fluid is of lower conductivity) which is disappearing very soon when the single bubble rises above the chamber. When one examines the resistance across the chamber over time T(t) one sees a flat base line, and occasional peaks that correspond to the rare occurrences of a bubble when the holes in the disc where in a matching positions. The time interval between such peaks depends on the regimen of the rotating discs and the position of their holes. Small differences in the properties of the light and heavy fluid will not affect the relative intervals between one peak and another. This is an important point as discussed above. On the other hand the setup as described will be relatively easy to simulate, and so generate the data pack (the shared randomness).

Illustration: Let's divide each disc is to 24*15 degrees sections. Each of the two discs has a trapezoid hole (or any other shape) in one of the 15 sections such that when properly aligned the holes in the two discs overlap. The two discs are rotated in an arbitrary fashion as they are positioned abreast to each other and they both separate between the light fluid below and the bulk of the heavy fluid above. As they each rotate, they occasionally create an overlap which results in a bubble of light fluid rising to the bulk of the heavy fluid.

At time point t=0 disc one is in position $p_0$. The hole in the other disc has a chance 1/24 to be overlapping the hole in disc one (considering the discs hopping through the 24 positions defined by the 24 angular sections). The two discs move about. Let's define θ as the time measure for a hole to move from the center of one of the imaginary 24 sections of the disc to the next. It will then take 16θ units of time on average for the next bubble to rise through overlapping holes. This emerges from resolving:

$(1-1/24)^x=0.50$

Yielding x=16. We have computed above the chance for a no-overlap after 16 movements of the holes, and it is 50%, for 16 sections, which is also the chance for an overlap to occur. Hence after 16θ time units we expect 5 bubbles to rise through the discs. This is the average figure. Given that the motions of the discs are arbitrary or randomized, we expect every 16θ time units to see 0, 1, 2, 3, 4, 5, 6, 7, 8, 9, 10, . . . and higher numbers more rarely for the count of bubbles.

We can therefore regard as "0" every case where in 16θ time units the number of bubbles is less than 5, and regard as "1" every instance where in 16θ time units we counted 6 bubbles or more.

Alternatively we can use the time interval between bubbles as a source of distinction between zero and one.

In this setup what matters is the disc rotational regimen. No reliance on the exact properties of the fluids.

We now consider a major modification: the hole in each disc is drilled so that it covers almost a full half of the disc area that is in contact with the fluid. When the two discs rotate they run between full flow of fluid when the holes overlap to zero flow of fluid when there is zero overlap between the holes. If one disc remained at rest and the other disc rotates at a stable speed, then the impact on the measurement in the chamber of resistance over time T(t) would have been a neat oscillating sinusoid alternating from maximum flow to zero flow. Alas, since the discs rotate in a randomized fashion the graph of resistance over time would be full of ups and downs from which the operators will try to extract a shared data pack (a randomized series). It will be a harder task then for the small holes case, and the result will be strongly dependent on the fluid characteristics of the rising fluid especially. The amount of flow through the overlapping large holes will depend on the specific gravity and more on the viscosity of the fluid, which again may be dependent on the exact temperature of the fluid. Slight distinctions in the geometries of the holes will also have an impact.

Many Rotating Discs (large holes): The more discs, the greater the entropy packed in the gadget. Each disc has randomized hole area and randomized distribution of holes. The more discs, the greater the passage area in each disc in order for a bubble to pop out frequently enough. (to get good throughput of the generated shared randomness).

Holes Variability Options: An adversary is expected to imitate the rotating discs, "guessing" the holes-layout. To make this infeasible, it is desired to mark the holes with much randomized input.

The RandoSol may be designed with a desired peak-to-peak average time interval, period—p. Where deviations from p will be used to extract a randomized binary string.

To achieve the desired period, p, over a desired number of discs t, rotated randomly, one will compute the average degree of open-area (holes) in all discs, o, One will then set up a variability range over o (o±Δo) for the various discs and use randomness to determine the value of area $o_i$ for disc i where o−Δo≤$o_i$≤o+Δo.

Next one will set up holes pattern for each disc i (i=1, 2, . . . t) so that the total area will be $o_i$.

We describe two ways to do so (there are many). One is to divide the disc to triangular sections, (with one side marked by an arc), like slicing a pie, and placing in each section a randomly selected shape for a hole.

Another is to divide the disc to polar elements through an array of projected straight lines from the center of the disc, and a sequence of circles centered around the center of each disc. This will identify areas of polar elements, each drawn through two projecting lines from the center of the disc, and two arcs cut from the sequence of circles placed around the center of the disc. It will be convenient to make the circles at the far side of the disc center closer to each other so that each polar element (between two projected lines and two arcs) will be of the same size.

Next one will randomly select a value in the range o−Δo and o+Δo, $h_i$.

Let the number of polar elements defined as above over each disc be e, namely each polar element is of area a=1/e (where the area of the disc is regarded as 1, and assuming as note above that all polar areas of the same size), one will then determine the number of polar elements that would become 'holes' to be: h=(o/a).

Next one will decide on a particular order to count the e polar element, and for each polar element in turn one will randomly decide whether it would be a hole-area or no hole area. The randomization will be such that h of the e holes will randomly be designated to become holes. After assigning q polar elements to become holes, and r elements to become no holes, the next hole will be randomly determined such that the chance for it to be designated as a hole will be (h−q)/(h−q+(e−h)−r)=(h−q)/(e−q−r), and the chance of for this polar elements to be designated no hole will be 1−(h−q)/(e−q−r).

This randomization will build the discs as containers of very high measure of entropy.

3.3 Physical Specification

We discuss size, speed, choice of fluids.

The RandoSol device may be of small size, a few centimeters, or it may be much larger. The larger the discs the more variability is possible for the holes and hence the greater the entropy of the device.

The faster the speed of rotating discs the greater the throughput of randomness.

The lower the viscosity of the fluids the easier it is for bubbles to form even through small and very temporary passage areas. Bubble production can also be accelerated by applying pressure to push the light fluid up, not just relying on gravity. RandoSol will work with fluids which are gases or liquids. Gases allow for more variability of throughput owing to positive pressure modifications An important question is the mechanism for rotating the discs.

3.3.1 Disc Rotation Mechanism

We consider the following options:
1. concentric axes rotation
2. cogwheel rotation
3. electro magnetic rotation Concentric Axes Rotation: in this mode each disc is welded to a cylinder that is part of a series of concentric cylinders where each cylinder is connected to an individual rotational mechanism. As the cylinders rotate, so do the discs welded to them. The outer cylinder are connected to discs of smaller surface area, they are missing area close to the center of the disc.

Cogwheel Rotation: in this mode each disc is fitted with a cogwheel pattern on its circular edge, and a matching smaller circular cogwheel is placed cog to cog so that when this small (driver) wheel rotates, it moves the connected cogwheel disc in the opposite direction. The driver cogwheels are placed physically apart (along the arcs of the discs) so that each will have room next to it to a rotational mechanism (like an electric motor).

Electromagnetic Rotation: an electro motor is built through rotating electro magnets around a magnetized disc.

3.3.2 Leaf-Adjusted Hole Sizing

Camera shutters and other instances make use of rotational leaves fitted on the edge of a hole such that these curved leaves may be pulled away and expose the entire hole, or they may be pushed one towards the other and thereby limit the size of the opening of the hole, all the way to complete closure.

By adding such a leaf-adjusted mechanism to holes in RandoSol discs one adds another critical factor (entropy) to the combination that will allow passage of the light fluid, or in general the 2nd fluid, through the stack of discs.

Given a stack of t discs, where each disc has g holes, let hole $h_{ij}$ be hole j of disc i where i=1, 2, . . . t and j=1, 2, . . . g. At any time point t within a given "play session" each hole $h_{ij}$ is in a rotational angler $\alpha_{ij}$ position, and its leaf-adjusted opening status is $I_{ij}$ where $0 \leq \alpha_{ij} \leq 360$ and $0 \leq I_{ij} \leq 100\%$ leaf-opening state. These 2tg values are randomized. Namely $\alpha_{ij}(t)$ and $I_{ij}(t)$ are 2tg randomized functions. Fluid passes through the stack of discs only in areas where each disc offers a matching opening. If even one disc does not offer a matching opening in a particular area then no flow occurs.

While the 2tg time dependent functions are the dynamic randomized data, the apparatus also features the structure of each of the t discs: where are the holes, at which size and at which shape in every disc. The latter are static factors, the former are dynamic, factors.

In case of multiple bubble stream, m streams, the total number of flow determining functions is 2tgm.

3.3.3 RandoSol Packaging

The RandoSol apparatus may be packaged as a tight box with wired or wireless connection to a nominal computing device. The discs may be built to be readily replaceable. This will enhance the security of the operation. Users might ad hoc agree on a particular selection of discs from a larger list, and then readily fit the selected discs into the apparatus.

3.4 Multiple Bubble Stream Implementation

The RandoSol apparatuses described so far presented one bubble stream that interferes with the stable reading of the electrical resistance across the measurement chamber. This single bubble stream configuration may be upgraded by feeding the measurement chamber with two, three or more bubble streams that each adds entropy and randomization to the summary measurement of the electrical resistance in the chamber over time.

The multiple bubble stream may be set vertical or horizontal, with liquids or gases—the full variety engineered for a single stream can be extended to a multiple bubble stream.

4.0 Discrete NEPSAR

NEPSAR can also be operated in a discrete mode, as follows. The t discs of the NEPSAR disc pack are divided to d angular divisions, where each division is defined as the area within two radii, and an arc portion between the edges of these two radii. The d divisions (polar elements) cover the entire area of the disc. The angular measure of each disc division is 2n/d. Each disc division is divided by a−1 concentric arcs to a 'hole' sections. For a total of ad hole-candidate area sections. Each hole candidate section may be cut out (become a hole), or stay put. So each division may be "holed" in $2^a$ ways, and the entire disc in $2^{ad}$ ways, and the whole stack of t discs in $2^{adt}$ ways.

The discs will rotate in a discrete fashion, namely each disc can be rotated to d states and not get stuck between states. Each rotation amounts to shifting the divisions in a circular way.

The whole stack of t discs can be in td states.

When the stack is in a particular state out of the td states, it has a definite passage area for the light fluid to rise up (using the vertical disposition, but it applies to other dispositions too).

In the discrete mode there is a mechanism to prevent flow. It may be a regular valve on the input line of the light fluid, or it may be two extra discs to the pack such that each of those extra discs has a 50% opening (hole area) thereby these two discs can be configured to allow full flow 50%+50%=100%, or zero flow: 50%-50%=0%. Either way one envisions the discrete RandoSol as an apparatus where in the opening state the light fluid is rot flowing, and therefore the curve measuring the electrical resistance in the measurement chamber is flat—no change in the resistance. Then the disc pack is put in one of the possible td states. Once done, the flow of the light fluid is allowed for a period of time, θ, after which the stop flow is reapplied. The θ period is called a 'shot'. During the shot the light fluid rises through whatever passage area is available to it through the stacked up discs, a bubble or several bubbles of light fluid at a total amount b is rising up to the measurement chamber. The greater the passage area and the longer the period θ the greater the total size of the bubbles, b, and the greater the impact on the resistance curve in the measurement chamber. This impact is in a form of a peak that rises and disappears as the light fluid flow dies off. (This is under the assumption that the next shot doe not happen too fast—see discussion ahead).

Since the passage area and the duration of the shot are easy to construct with great similarity among the parties, one would expect these peaks to be of same mutual intervals, and of same relative heights, as they appear in faraway apparatuses.

The number of discs, the degree of hole-surfaces can be adjusted so that the likelihood for bubble formation will be such that for each shot there will be a corresponding peak. By spreading the location of holes in each disc in a random fashion, and by randomly deciding the shift position for each disc, one passes on this randomness to the sizes the peaks. Peaks of various sizes will easily allow for extraction of a binary string where, for example, for a peak higher than its predecessor, the identity will be '1'; if the peaks is lower than its predecessor, it will be given the identity '0'. If the peaks are of same, or similar height, then the peak identity will be undecided. The decided peaks (bits) should be the same in every apparatus the process operates.

The contraption as described can be built with very few holes, so that the chance for holes to overlap over a large number t of discs will be negligible. In that case the resistance-time curve will be flat—undisturbed, no bubbles, this is a 'zero bubble option'. Albeit one could construct the discs such that almost all the discs area will be "holes". In that case no matter what shift position each disc is placed, the quantity of bubble material will be maximum 'the full bubble option'. For any holes situation between these two extremes (zero and full options) the size of the peak, or say the quantity of light fluid that emerges through the discs will be between these two extremes. And again, to the extent that the holes distribution is randomized and the shift positions for the disc pack is randomized, so is the distribution of peak heights.

Say then that the designer can determine the average percentage of holes-area for the disc pack to place the contraption somewhere at the middle point between the zero situation and the full situation, and this will allow for maximum range for randomization around some mean value.

The variability of this system as described with fixed d divisions for each disc, and t discs is $d^t$ possible states. So for d=32, and t=8 there are $32^8=1.1*10^{12}$ possible states.

This already high degree of entropy can be further increased by the following means:
1. division variability
2. more shift positions
3. pressure variability
4. multiple streams Instead of having each disc divided to d divisions, one could divide each disc to a different number of divisions, and even a given disc may be divided to uneven divisions.

The number of shift positions may be independent of the number of divisions in a disc, a larger number.

The RandoSol contraption may be operated on a positive pressure over the penetrating fluid rather than rely on gravity. This positive pressure P may be mapped to p pressure values, to be selected randomly. Clearly given the same passage area, if the positive pressure is greater, the size of the bubbles is greater.

The multi-stream options described above can readily be applied for the discrete RandoSol thereby creating a still larger variety.

4.1 Application Protocols

The discrete NEPSAR can be used in various protocols, like:
1. show-no-show
2. peak size 4.1.1 Show/No Show Here the idea is to adjust the holes area and the number of discs so that for every state of the disc pack there would be about a 50% chance for a bubble to emerge from the pack. By running the apparatus many times, the recording of whether a bubble showed up or not would be translated to a randomized bit string.

Illustration: Let there be 8 discs each divided to 16 "pie slices", (divisions) and within each slice there are 8 concentric area locations (polar elements) where each area may be a hole or not a hole. Let us randomly assign each area to be a hole or not a hole at a 50% chance for each option. Given a hole area in disc 1, the chance that at a given state all the corresponding areas on all other 7 discs will be a "hole state" is $(0.5)^7=0.008$. There are $16*8=128$ such polar elements on the first discs, half of them are hole-areas, (so designed) namely 64 holes on disc one. Each of these 64 holes has a chance of 0.008 to be associated with holes through the other 7 discs, so the chance that one of those holes will become a fluid passage area is somewhat less than $0.008*64=0.5$. This means that for every shot there is a 50% chance for a peak to be marked on the resistance-time curve and a 50% chance for no disturbance. By designating bubble show case, as 1 and a no-show as 0, one extracts from the raw payload of the discrete RandoSol operation a randomized binary string.

4.1.2 Peak Size

By adjusting the chance for a shot to be considerably higher than 50%, one also increases the chance for two or more bubbles to be emerging from the disc pack into the measurement chamber. This will result in a greater peak as recorded on the resistance-over-time curve. The size of these peaks may be a basis for extracting a binary series from the raw payload. E.g. if a peak if larger than its predecessor it is one; if it is smaller than its predecessor it is zero. If unclear it is marked as 'undecided', and then handled through the community reconciliation.

4.1.3 Packed-Up Shots

By making the shots more frequent, one would allow for the next bubble to emerge to the measurement chamber before the predecessor bubble cleared the chamber. The combination of the not yet left bubble, and the new popping up bubble will impact the resistance measurement as a larger peak. The third shot may be executed also, soon enough that parts of the three bubbles stay in the measurement chamber together. The result is a fast changing resistance-time curve, from which a shared binary string will be extracted.

5.0 Non-RandoSol Randomizers

Radosol is an apparatus that generates randomness through the complexity of fluid flow via a stack of rotating discs with various holes in them so that the fluid passage area changes randomly and thereby generates random behavior in time measurement of electrical conductivity of a mix of the rising fluid and the resident fluid which are of different electrical conductivity values.

The RandoSol embodiment may be abstracted to a physical apparatus that is activated by digital randomness, $R_d$ so that it generates corresponding physical randomness, $R_p$ that is measured, and the measurement then is extracted to a resultant digital randomness $R^*_d$.

As long as the apparatus structure that convert the input digital randomness, $R_d$ to the output digital randomness $R^*_d$, remains secret, so does $R^*_d$ (even if $R_d$ is not secret).

The apparatus that converts $R_d$ to $R_p$ may be simulatable or not simulatable. In the first case, one could simulate the randomness generation through non physical means. The more simulatable the apparatus the more it loses its complexity advantage.

Physical complexity may be achieved via complex fluids flow as the case is with RandoSol, The RandoSol has the advantage of being able to be handled in a simulatable way and then modified, through increased complexity making it non simulatable, yet repeatable enough for its purpose.

As an example for a simulatable NEPSAR apparatus we present RandoLight: where a stack of discs similar to those used in RandoSol is used to separate a source of light (or other electromagnetic radiation) emitted from a surface abreast of the discs, towards a light detector in a form of a surface also abreast of the stack of discs, so that when the stack of discs is rotated such that the light emitted from the light source has a passage through the rotating hole-ridden discs, it is properly sensed on the light detector. To the extent that the light passage area varies randomly because the discs are rotated randomly so does the measurement of light on the detector surface. This measurement over time is then converted into a digital bit string.

Unlike the complexity of fluid flow, light passage is 'clean' and one could readily simulate any stack of discs and generate the same randomness that was generated by the physical discs.

6.0 Summary Description of the Invention

This invention has a system component and a methodology component. It is described in 16 cross referenced paragraphs.

6.1 Summary Description of The System Component of this Invention

1. Proposing a physical randomness generating apparatus manufactured in k duplicates, operated by k respective operators, placed in k mutually remote locations, where each duplicate is operated through shared activation settings; these activation settings determine the terms of a physical action within the duplicates, called a "randomization session" carried out in each of the k apparatuses, each generating randomized data, regarded as "raw payload", $R^*_1, R^*_2, \ldots R^*_k$ which are mutually close enough: $R^*_1 \sim R^*_2 \sim \ldots \sim R^*_k$ so that the k operators will execute a mutual conversation through which each operator converts its raw payload to the same, shared secret ready payload: $R_1=R_2= \ldots =R_k=R_{shared}$.

2. Further elaborating on the apparatus in paragraph 1 where the apparatus generates a randomized mix of two fluids, L, and H, where (i) fluid H has a greater specific gravity than fluid L, and where (ii) L and H are not mutually soluble, and (iii) where L and H have a different electrical conductivity;

and where the apparatus has a built in "measurement chamber" (chamber) which is a fluid container fitted with electrodes and electronics necessary to measure effective electrical resistance of the fluid that fills the measurement chamber, and where the chamber contains fluid H before the randomization session, and after the randomization session, and where the randomization session is carried out by creating a randomized flow of fluid L into the chamber, so that the measurement of the effective electrical resistance within the chamber is recorded as a resistance-curve-over-time which reflects the randomness of the flow of fluid L, of different electrical conductivity from fluid H, into the chamber; this curve is then digitized to extract the raw randomness, which subsequently is converted to the shared ready randomness.

3. Further elaborating on the apparatus of paragraph 2 where the flow of fluid L into the chamber is being carried out by applying either buoyancy, or positive pumping pressure on L towards a stack of center-axis sharing discs, abreast one next to the other, where the discs are drilled with randomized holes, and where during the randomization session the discs are rotated in a randomized fashion as to direction and as to angular speed, thereby creating circumstances where holes in the discs are aligned to allow fluid L to flow from behind the stack into the measurement chamber; this alignment changes with the randomized rotation of the discs, so that the flow of fluid L under buoyancy or through positive pumping pressure from behind the stack into the measurement chamber is also randomized, and hence the resistance-over-time curve is also randomized; the session terminates when the discs stop rotating and rest in a mutual alignment where there is no sufficient overlap among the holes of the various discs to allow for fluid L to keep flowing into the measurement chamber, and fluid L being lighter than fluid H, rises above the measurement chamber, which again is filled with fluid H;

and where the apparatus features a fluid container, an L-reservoir, above the measurement chamber where the lighter fluid L rises to, to clear the chamber from any leftover fluid L, ensuring the chamber is filled with fluid H, ready for the next randomness session, and where fluids L and H are kept in a closed system where a pump moves fluid L from the L-reservoir towards the disc pack to carry out the next randomization session.

4. Further elaborating on the apparatus in paragraph 3 where fluid L is atmospheric air, and fluid H is an electrical conductive liquid, and where a pump sucks open air through the discs pack, and the air emerges from the measurement chamber back into the open.

5. Further elaborating on the apparatus in paragraph 3 where the discs are welded each into concentric cylinders around the axis perpendicular to the surface of the discs, and each cylinder is rotated independently.

6. Further elaborating on the apparatus in paragraph 3 where the discs are manufactured as cogwheels, and are rotated by a smaller driver cogwheel which is rotated by an electric motor, 7. Further elaborating on the apparatus in paragraph 3 where the circumference of the discs is fitted with magnets, and surrounded by a larger circular structure abreast with the circumference of each disc, and where this structure is fitted with electromagnets that rotate the disc like with an electric motor.

8. Further elaborating on the apparatus in paragraph 3 where the surfaces of the discs are divided to $d*s$ polar elements, defined by dividing each disc to d angular divisions of $2\pi/d$ angles each, and dividing each division to s sections through concentric arcs, the concentric arcs are placed so that the polar elements are set to be of the same area, and where each disc is associated with a number $h \le d*s$ of polar elements to be drilled as holes, and where a randomization process selects which of the $d*s$ polar elements will become holes.

9. Further elaborating on the apparatus of paragraph 8 where the discs come to rest at d spots with $2\pi/d$ angular intervals such that a stack of w discs can be placed in $d^w$ states, and where a valve placed before the stack is initially in a 'closed' position, barring fluid L from flowing to the measurement chamber, and where the stack is put in one of the $d^w$ states, followed by opening of the valve for an interval of time $\Delta t$, ("shot"), then closing it again; allowing for an amount of fluid L, "bubble", to flow through the stack into the measurement chamber, the bubble then rising to the L-reservoir;

the quantity of fluid L passing through the stack during the shot depends on how much fluid passage area is available to the moving fluid L, as determined by the mutual alignment of the w discs, and corresponding to the pressure that moves fluid L through the stack into the measurement chamber;

the extent to which the holes in the discs are randomized, the selection of the state of the stack is randomized, and the moving pressure on liquid L is randomized, is the extent of randomization of the size of the bubble that enters the measurement chamber, and is also the extent of randomization of the raw randomization payload.

10. Further elaborating on the apparatus of paragraph 3 where the measurement chamber is connected to multiple entry ports for fluid L, each entry port is connected to a different disc stack through which fluid L is moved to the measurement chamber; all the entry ports are connected to randomized disc stacks, where the holes in each disc is randomized, and the rotation (direction and speed) of each disc in each stack is also randomized;

the totality of L fluid that fills up the measurement chamber at each moment determines the disturbance to the reading of the electrical resistance through this chamber at that moment.

11. Further elaborating on the apparatus in paragraph 3 where the holes in the discs are fitted with leaf-shutter mechanism so that the actual opening area of these holes is controllable, and randomizable, through controlling the state of closure of the fitted leaves.

12. Further elaborating on the apparatus in paragraph 3 where the discs that combine into the disc stack, are readily interchanged, and where users can decide on an agreed upon set of discs, selected from a disc collection.

6.2 Summary Description of The Methodology Component of this Invention

13. Proposing a method for generating k duplicates of random bits strings: $R_1, R_2, \ldots R_k$, in k mutually remote locations, respectively, where $R_1 = R_2 = \ldots R_k = R_{shared}$ wherein k method operators in the k remote locations, each applying that method, by sharing activation randomness, $R^a$, applied over a shared secret physical apparatus of randomized construction, at the disposal of each operator, where the k randomized constructions $R^p_1, R^p_2, \ldots R^p_k$, are mutually equal except for normal manufacturing variance: $R^p_1 = R^p_2, \ldots = R^p_k$, wherein the k applications of $R^a$ over the k $R^p_i$ for $i=1, 2, \ldots k$ result in k randomized bit strings $R^q_i$ for $i=1, 2, \ldots k$, regarded as 'raw randomization payloads', which are mutually similar enough so that by each operator exchanging data packs: $D_1, D_2, \ldots D_k$ the k operators are able each to convert their respective $R^q_i$ for $i=1, 2, \ldots k$ to the shared bit string $R_{shared} = f(R^q_i, D_1, D_2, \ldots D_k)$ for $i=1, 2, \ldots k$, use-ready randomization payload; this operation is regarded as a 'randomization session' and is repeated with different, randomized or arbitrary activation randomness, $R^a$, which is pre-shared among the operators, or is communicated among the operators over insecure channel.

14. Further elaborating on the method in paragraph 13 wherein the raw randomization payload is in a form of an analog measurement of electrical resistance, T, over time, T(t), conducted for each duplicate, and where the analog measurement is digitized to generate the raw payload randomness $R^q_i$ for $i=1, 2, \ldots k$, and where the operators first share the size of their raw randomness payload bit string, and if there is any disagreement on the size of the bit string, the operators decide on different activation randomness, $R'^a$, and start again;

and if there is a full agreement of the size of the raw randomness payload strings then the operators share with one another the identities of bits in their raw randomness payload string for which they have non negligible doubt as to their identity, as determined by the analog-to-digital process that operated on the respective measured analog time series; any bit for which any operator is expressing doubt as to their identity, is removed from the raw-randomness payload string processed by each operator, the remaining bits form k ready-candidate payload bit strings $R^*_1, R^*_2, \ldots R^*_k$, the operators randomly select $s<r$ bits, where r is the bit size of the ready-candidate payloads, and mutually share the identities of these s bits; if for any of these s bits there was any operator who concluded that its identity is different from any other operator, then the ready-candidate payload is designated as a failed operation, and the method of claim 13 starts again with different randomization settings;

if the identities of these s bits is found in agreement within all operators then the operators regard the remaining r-s bits (in order) as a proper shared random bit string, $R_{shared}$, and thereby terminate the method successfully.

15. Further elaborating on the method of paragraph 13 where the shared randomness in one session serves as the activation randomness $R^a$ for a subsequent randomization session.

16. Further elaborating on the method of paragraph 13 where an arbitrary operator checks the effectiveness of a given activation randomness, $R^a$, by applying the method over a set of k' duplicates of the apparatus, at its disposal, trying new activation randomness, $R^a$, options until the operator achieves a successful outcome over its k' apparatus duplicates, and then offering this particular $R^a$ to the other (k-1) operators for a subsequent randomization session.

What is claimed is:

1. A system used by k mutually remote parties to share a random bit string by using each a duplicate of a non-entanglement, physical, shared Ad-Hoc randomness (NEPSAR) apparatus; the parties conduct a round of operation wherein;

each NEPSAR duplicate is comprising:
(a) a conductive fluid,
(b) a fluid container, serving as a measurement chamber,
(c) two electrodes,
(d) a power source,
(e) an electric current meter,
(f) an electronic circuitry,
(g) a pump,
(h) air pathways;
the conductive fluid (a) is placed in the fluid container (b), which is fitted with the two electrodes (c), which are connected to the power source (d) that generates electrical current that flows through the conductive fluid (a) and is also connected to the electric current meter (e) and to the electronic circuitry (f) that transforms the fluctuating electrical current (e) to a corresponding bit string;
the pump (g) blows air through the air pathways (h) into the conductive fluid (a) generating air bubbles of a pattern determined by settings adjusted over the pump (g) and the air pathways (h); wherein each NEPSAR duplicate is activated through openly shared activation settings, operating in the following sequence:
(i) each NEPSAR duplicate activates the electrically powered pump (g), that blows air bubbles into the fluid container (b), where the conductive fluid (a) is set to conduct electrical current: the bubbles change in size, and flow rate according to the activation settings, and since the air bubbles are insulators, the electrical current (e) that flows through the conductive fluid (a) when the bubbles rise through it, is changing in magnitude according to the flow pattern of the air bubbles, and to the extent that the bubbles are in a chaotic pattern, so does the electrical current in the conductive fluid (a) appear in random fluctuations;
the fluctuating current is measured by the electric current meter (e), these measurements are expressed as a bit series ($R^*$) where the bits appear randomized, $R^*$ is a 'raw randomness bit series';
the k NEPSAR duplicate apparatuses thereby generate in the privacy of each party the raw bit series ($R^*_1$, $R^*_2$, ... $R^*_k$);
(ii) the parties then randomly designate t test bits from the n bits of each series, $n=|R^*_i|$ for $i=1, 2, \ldots k$ and mutually expose the values of the test bits;
(iii) if all k parties agree on all the values of the t test bits then they conclude that with a probability, Pr, where Pr→1 for t→n, the untested (n−t) bits are equal in value for all k parties, thereby defining a trusted shared bit series: $R_1, R_2, \ldots R_k$ where $|R_i|=(n-t)$;
(iv) and if any test bits as mutually disclosed by any party are different than the value claimed by other parties, then, this round of operation is regarded as failure, and the sequence (i, ii, iii, iv) restarts again using different activation settings.

2. The apparatus in claim 1 where the apparatus generates a randomized mix of two fluids, L, and H, where
(i) fluid H has a greater specific gravity than fluid L, and where
(ii) L and H are not mutually soluble, and where
(iii) L and H have a different electrical conductivity;
and where the measurement chamber (b) contains fluid H before the round of operation and after the round of operation;
and where the round of operation is carried out by creating a randomized flow of fluid L into the chamber, so that the measurement of the effective electrical resistance within the measurement chamber is recorded as a resistance-curve-over-time which reflects the randomness of the flow of fluid L, into the chamber; this curve is then digitized to extract the raw randomness, which subsequently is converted to the trusted shared bit series.

3. The apparatus of claim 2 where the flow of fluid L into the measurement chamber is being carried out by applying either buoyancy, or positive pumping pressure on L towards a stack of center-axis sharing discs, abreast one next to the other, where the discs are drilled with randomized holes, and where during the round of operation the discs are rotated in a randomized fashion as to direction and as to angular speed, thereby creating circumstances where holes in the discs are aligned to allow fluid L to flow from behind the stack into the measurement chamber; this alignment changes with the randomized rotation of the discs, so that the flow of fluid L under buoyancy or through positive pumping pressure from behind the stack into the measurement chamber is also randomized, and hence the resistance-over-time-curve is also randomized; the round of operation terminates when the discs stop rotating and rest in a mutual alignment where there is no sufficient overlap among the holes of the various discs to allow for fluid L to keep flowing into the measurement chamber, and fluid L being lighter than fluid H, rises above the measurement chamber, which is filled with fluid H;
and where the apparatus features a second fluid container, an L-reservoir, above the fluid container (b) where the lighter fluid L rises to, to clear the fluid container from any leftover fluid L, ensuring the fluid container (b) is filled with fluid H, ready for the next round of operation,
and where fluids L and H are kept in a closed system where a pump moves fluid L from the L-reservoir towards the disc pack to carry out the next round of operation.

4. The apparatus in claim 3 where fluid L is atmospheric air, and fluid H is an electrically conductive liquid, and where a pump sucks open air through the discs pack, and the air emerges from the measurement chamber (b) back into the open.

5. The apparatus in claim 3 where the discs are welded each into concentric cylinders around the axis perpendicular to the surface of the discs, and each cylinder is rotated independently.

6. The apparatus in claim 3 where the discs are manufactured as cogwheels, and are rotated by a smaller driver cogwheel which is rotated by an electric motor.

7. The apparatus in claim 3 where the circumference of the discs is fitted with magnets, and surrounded by a larger circular structure abreast with the circumference of each disc, and where this structure is fitted with electromagnets that rotate the disc like with an electric motor.

8. The apparatus in claim 3 where the surfaces of the discs are divided to d*s polar elements, defined by dividing each disc to d angular divisions of $2\pi/d$ angles each, and dividing each division to s sections through concentric arcs,
the concentric arcs are placed so that the polar elements are set to be of the same area,
and where each disc is associated with a number $h \leq d*s$ of polar elements to be drilled as holes,
and where a randomization process selects which of the d*s polar elements will become holes.

9. The apparatus of claim 8 where the discs come to rest at d spots with $2\pi/d$ angular intervals such that a stack of w discs can be placed in $d^w$ states, and where a valve placed before the stack is initially in a 'closed' position, barring fluid L from flowing to the measurement chamber, and where the stack is put in one of the $d^w$ states, followed by opening of the valve for an interval of time $\Delta t$, "shot", then closing it again; allowing for an amount of fluid L, "bubble", to flow through the stack into the measurement chamber, the bubble then rising to the L-reservoir;

the quantity of fluid L passing through the stack during the shot depends on how much fluid passage area is available to the moving fluid L, as determined by the mutual alignment of the w discs, and corresponding to the pressure that moves fluid L through the stack into the measurement chamber;

the extent to which the holes in the discs are randomized, the selection of the state of the stack is randomized, and the moving pressure on liquid L is randomized, is the extent of randomization of the size of the bubble that enters the measurement chamber, and is also the extent of randomization of the raw bit series.

10. The apparatus of claim 3 where the measurement chamber is connected to multiple entry ports for fluid L, each entry port is connected to a different disc stack through which fluid L is moved to the measurement chamber; all the entry ports are connected to randomized disc stacks, where the holes in each disc are randomized, and the rotation, direction and speed, of each disc in each stack is also randomized;

the totality of L fluid that fills up the measurement chamber at each moment determines the reading of the electrical current through the measurement chamber at that moment.

11. The apparatus of claim 3 where the holes in the discs are fitted with leaf-shutter mechanism so that the actual opening area of these holes is controllable, and randomizable, through controlling the state of closure of the fitted leaves.

12. The apparatus of claim 3 where the discs that combine into the disc stack, are readily interchanged, and where users can decide on an agreed upon set of discs, selected from a disc collection.

13. A method for:

generating k duplicates of random bits strings: $R_1, R_2, \ldots R_k$ in k mutually remote locations, respectively, where $R_1=R_2=\ldots R_k=R_{shared}$, a trusted shared randomness; a raw method; the method comprising successive rounds of operations, the round of operation comprising:

k operators in the k remote locations, each applying the raw method, by sharing a process of randomness activation settings, $R^a$, applied over a shared secret physical apparatus of randomized construction, where each operator has a duplicate of the shared apparatus, where the k randomized constructions $R^p_1, R^p_2, \ldots R^p_k$, are mutually equal except for normal manufacturing variance: $R^p_1=R^p_2=\ldots =R^p_k$, wherein the k applications of $R^a$ over the k $R^p_i$ for i= 1, 2, ... k result in k randomized bit strings $R^q_i$ for i=1, 2, ... k, which are 'raw randomization payloads', which are mutually similar enough so that by each operator exchanging data packs: $D_1, D_2, \ldots D_k$ the k operators are able each to convert their respective $R^q_i$ for i=1, 2, ... k to the trusted shared bit string $R_{shared}=R_1=R_2=\ldots R_k=f(R^q_i, D_1, D_2, \ldots D_k)$ for i=1, 2, ... k; thereby completing the round of operation;

rounds of operations are repeated with different, randomized and arbitrary randomness activation settings, $R^a$, which is pre-shared among the operators, or is communicated among the operators over an insecure channel.

14. The method in claim 13 wherein the raw method is in a form of an analog measurement of electrical current, T, over time, t, T(t), conducted for each duplicate of the shared apparatus, and where the analog measurement is digitized to generate the raw payload randomness $R^q_i$ for i=1, 2, ... k, and where the operators first share the size of their raw randomness payload bit string, and if there is any disagreement on the size of the bit strings, the operators select a different randomness activation settings, $R'^a$, and reapply the method;

and if there is a full agreement of the size of the raw randomness payload strings then the operators randomly select s<r bits, where r is the bit size of the raw payload randomness, $r=|R^q_i|$ for i=1, 2, ... k; and mutually share the identities of these s bits;

if for any of these s bits there was any operator who concluded that its identity is different from any other operator, then the raw payload randomness is designated as a failed round of operation, and a new round of operation is applied, using different randomness activation settings, if the identities of these s bits is found in agreement within all operators then the operators treat the remaining r–s bits (in order) as a shared random bit string, $R_{shared}$ among the k operators, and thereby terminate the method successfully.

15. The method of claim 13 where the shared randomness in one session serves as the activation randomness $R^a$ for a subsequent randomization session.

16. The method of claim 13 where an arbitrary operator checks the effectiveness of a given randomness activation setting, $R^a$, by applying the method over a set of k' duplicates of the apparatus, at its disposal, trying new randomness activation settings until the operator finds a particular randomness activation setting $R^{*a}$ that generates a successful round of operation over the k' apparatus duplicates, and then offering $R^{*a}$ to the other (k–1) operators for a subsequent round of operation.

* * * * *